(12) United States Patent
Gajanayake et al.

(10) Patent No.: US 12,738,855 B2
(45) Date of Patent: Sep. 15, 2026

(54) ELECTRICAL SYSTEM

(71) Applicant: ROLLS-ROYCE plc, London (GB)

(72) Inventors: Chandana J. Gajanayake, Singapore (SG); Devinda A. Molligoda, Nugegoda (LK)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 18/813,326

(22) Filed: Aug. 23, 2024

(65) Prior Publication Data

US 2025/0088116 A1 Mar. 13, 2025

(30) Foreign Application Priority Data

Sep. 7, 2023 (GB) ...................................... 2313647

(51) Int. Cl.
*G05F 1/10* (2006.01)
*B64D 41/00* (2006.01)
*H02M 3/335* (2006.01)

(52) U.S. Cl.
CPC ........ *H02M 3/33576* (2013.01); *B64D 41/00* (2013.01); *B64D 2221/00* (2013.01)

(58) Field of Classification Search
CPC ................................................ H02M 3/33576
See application file for complete search history.

(56) References Cited

U.S. PATENT DOCUMENTS 7,557,532 B2 7/2009 Liu et al.
9,614,443 B2 4/2017 Kay et al.
10,483,573 B2 11/2019 Agnew et al.
2004/0090215 A1 5/2004 Ishii et al.
2010/0207598 A1* 8/2010 Hamatani .......... H05K 7/20945 323/351
2010/0244798 A1* 9/2010 Nakatomi ............ H02M 3/156 323/282
2013/0002186 A1* 1/2013 Iwahori ............... H02M 5/4585 318/722

(Continued)

FOREIGN PATENT DOCUMENTS

EP 4148934 A2 3/2023
WO 2023069082 A1 4/2023

OTHER PUBLICATIONS

European search report dated Feb. 24, 2025, issued in EP Patent Application No. 24193244.1.

(Continued)

*Primary Examiner* — Ryan Johnson
*Assistant Examiner* — Esayas G Yeshaw
(74) *Attorney, Agent, or Firm* — Shumaker & Sieffert, P.A.

(57) ABSTRACT

There is provided an electrical system, comprising: a DC source configured to provide a DC electrical power; a bus electrically coupled to the DC source, the bus comprising a load, a DC-DC converter having an input side and an output side; a switching arrangement electrically coupled to the DC-DC converter, the DC source and the bus; and a control system. The input side of the DC-DC converter is configured to receive a fraction of the DC electrical power provided by the DC source. The fraction is less than unity. The control system is configured to operate the switching arrangement to selectively configure the electrical system, in at least one of a voltage increase mode and a voltage decrease mode.

15 Claims, 9 Drawing Sheets

(56) References Cited

U.S. PATENT DOCUMENTS

2017/0201176 A1 7/2017 Onishi
2018/0115245 A1 4/2018 Lau
2023/0207188 A1 * 6/2023 Srivastava .......... H02M 1/0032
363/21.01

OTHER PUBLICATIONS

Great Britain search report dated Feb. 17, 2024, issued in GB Patent Application No. 2313647.6.

* cited by examiner

ELECTRICAL SYSTEM

CROSS-REFERENCE TO RELATED APPLICATIONS

This specification is based upon and claims the benefit of priority from United Kingdom patent application number GB 2313647.6 filed on Sep. 7, 2023, the entire contents of which is incorporated herein by reference.

BACKGROUND

Technical Field

This disclosure concerns an electrical system comprising: a DC source; a bus electrically coupled to the DC source, the bus comprising a load; a switching arrangement electrically coupled to the DC source and the bus; a DC-DC converter; and a control system. The disclosure further concerns an aircraft comprising such an electrical system.

Description of the Related Art

In view of current industrial trends and objectives, it is desirable to incorporate a greater degree of electrical functionality on an aircraft airframe and/or on a propulsive device such as a gas turbine engine. In particular, it is desirable to provide an electrical system which is operable across a broad range of operating scenarios.

U.S. Pat. No. 7,557,532 B2 describes a voltage supplying apparatus comprising a fuel cell, a DC-DC voltage converter and a control circuit. The DC-DC voltage converter is used to receive a voltage outputted from the fuel cell and then to output another voltage. Then, the respective voltages outputted from the fuel cell and the DC-DC voltage converter are combined to be an output voltage of the voltage supplying apparatus. The control circuit is used to control operation of the DC-DC voltage converter according to a magnitude of the output voltage of the voltage supplying apparatus.

U.S. Pat. No. 10,483,573 B2 describes a fuel cell unit comprising a fuel cell and a regulating voltage converter, and further describes a fuel cell module comprising a plurality of fuel cell units connected in parallel.

SUMMARY

According to a first aspect, there is provided an electrical system comprising: a DC source configured to provide a DC electrical power; a bus electrically coupled to the DC source, the bus comprising a load; a DC-DC converter having an input side and an output side; a switching arrangement electrically coupled to the DC-DC converter, the DC source and the bus; and a control system. The input side of the DC-DC converter may be configured to receive a fraction of the DC electrical power provided by the DC source, with the fraction being less than unity. The control system may be configured to operate the switching arrangement to selectively configure the electrical system in at least one of a voltage increase mode and a voltage decrease mode. It may be that, when the electrical system is configured in the voltage increase mode, the output side of the DC-DC converter is coupled to the DC source and the bus by the switching arrangement to supply a voltage to the bus corresponding to addition of a voltage across the DC source and a voltage across the output side of the DC-DC converter. It may be that, when the electrical system is configured in the voltage decrease mode, the output side of the DC-DC converter is coupled to the DC source and the bus by the switching arrangement to supply a voltage to the bus corresponding to a difference between the voltage across the DC source and the voltage across the output side of the DC-DC converter. The DC-DC converter may be an isolated DC-DC converter.

It may be that, when the electrical system is configured in the voltage increase mode, the output side of the DC-DC converter is coupled to the DC source and the bus by the switching arrangement such that, in use, the switching arrangement supplies a voltage to the bus which is substantially equal to a sum of the voltage across the DC source and the voltage across the output side of the DC-DC converter.

It may be that, when the electrical system is configured in the voltage decrease mode, the output side of the DC-DC converter is coupled to the DC source and the bus by the switching arrangement such that, in use, the switching arrangement supplies a voltage to the bus which is substantially equal to a difference between the voltage across the DC source and the voltage across the output side of the DC-DC converter.

It may be that the output side of the DC-DC converter is coupled in series with respect to the DC source and the bus when the electrical system is configured in each of the voltage decrease mode and the voltage increase mode.

The switching arrangement may be configured to selectively configure the electrical system in the voltage increase mode and in the voltage decrease mode.

It may be that: when the electrical system is configured in the voltage decrease mode, a polarity of the output side of the DC-DC converter is in a first orientation with respect to a polarity of the DC source; and when the electrical system is configured in the voltage increase mode, the polarity of the output side of the DC-DC converter is in a second orientation with respect to the polarity of the DC source, and wherein the second orientation opposes the first orientation.

The control system may be configured to: monitor the voltage across the DC source; and operate the switching arrangement to selectively reconfigure the electrical system between the voltage increase mode and the voltage decrease mode based on the monitored voltage across the DC source.

The control system may be configured to operate the switching arrangement to selectively reconfigure the electrical system in: the voltage increase mode in response to a determination that the monitored voltage across the DC source is less than a first voltage threshold; and the voltage decrease mode in response to a determination that the monitored voltage across the DC source is greater than a second voltage threshold, the second voltage threshold being equal to or greater than the first voltage threshold.

It may be that the output side of the DC-DC converter comprises an output capacitor and the control system is configured to: monitor the voltage across the bus; in response to a determination that the monitored voltage across the DC source is less than the first voltage threshold, sequentially execute the steps of: charging the output capacitor until the voltage across the output capacitor is equal to or within a target range of a difference between the monitored voltage across the bus and the monitored voltage across the DC source; and then coupling the output side of the DC-DC converter to the DC source and the bus; and/or in response to a determination that the monitored voltage across the DC source is greater than the second voltage threshold, sequentially execute the steps of: charging the output capacitor until the voltage across the output capacitor is equal to or within a target range of a difference between the monitored voltage across the bus and the monitored voltage across the DC source; and then coupling the output side of the DC-DC converter to the DC source and the bus.

The control system may be configured to: monitor the voltage across the DC source; and control a conversion ratio of the DC-DC converter based on the monitored voltage across the DC source.

It may be that: the control system is configured to operate the switching arrangement to selectively configure the electrical system in a converter isolation mode; and when the electrical system is configured in the converter isolation mode: the input side of the DC-DC converter is decoupled from the DC source and/or the bus; and/or the output side of the DC-DC converter is decoupled from the DC source and/or the bus.

The control system may be configured to operate the switching arrangement to selectively reconfigure the electrical system in: the converter isolation mode in response to a determination that the monitored voltage across the DC source is: between the first voltage threshold and the second voltage threshold, or equal to the first voltage threshold or the second voltage threshold.

The switching arrangement may include: a first pair of switching devices coupled in series through a first junction, and a second pair of switching devices coupled in series through a second junction. The first pair of switching devices and the second pair of switching devices may be coupled in parallel with each other with respect to a pair of converter connection terminals. The DC source and the bus may be coupled to the switching arrangement at the first junction and the second junction. The output side of the DC-DC converter may be coupled to the switching arrangement at the pair of converter connection terminals.

It may be that: the first pair of switching devices is comprised of a first primary switching device and a first secondary switching device; the second pair of switching devices is comprised of a second primary switching device and a second secondary switching device; and the control system is configured to operate the switching arrangement to selectively reconfigure the electrical system in: the voltage decrease mode by operating the first primary switching device and the second secondary switching device in a closed state and operating the first secondary switching device and the second primary switching device in an open state, and the voltage increase mode by operating the first secondary switching device and the second primary switching device in the closed state and operating the first primary switching device and the second secondary switching device in the open state.

It may also be that: the control system is configured to operate the switching arrangement to selectively reconfigure the electrical system in the converter isolation mode by: operating the first primary switching device and the second primary switching device in the open state; and/or operating the first secondary switching device and the second secondary switching device in the open state.

It may be that each of the first pair of switching devices and each of the second pair of switching devices is a semiconductor-based power switching device.

Further, it may be that, when the electrical system is configured in any of the voltage increase mode and the voltage decrease mode: the input side of the DC-DC converter is coupled in parallel with respect to the DC source; and the output side of the DC-DC converter is coupled in series with respect to the DC source and the bus.

It may also be that, when the electrical system is configured in each of the voltage increase mode and the voltage decrease mode: the input side of the DC-DC converter is coupled in parallel with respect to the DC source between the DC source and the switching arrangement.

In addition, it may be that, when the electrical system is configured in each of the voltage increase mode and the voltage decrease mode: the input side of the DC-DC converter is coupled in parallel with respect to the DC source between the switching arrangement and the bus. It may be that the bus comprises an additional electrical source.

The input side of the DC-DC converter may be galvanically isolated from the output side of the DC-DC converter. The DC-DC converter may include a transformer. The transformer may magnetically couple the input side of the DC-DC converter to the output side of the DC-DC converter. The DC-DC converter may be a flyback converter, a forward converter or a dual active bridge converter. The DC source may include a battery or a fuel-cell pack.

According to a second aspect there is provided an aircraft comprising an electrical system in accordance with the first aspect. The load may include a motor configured to drive a propulsive device of the aircraft, such as a propellor or a fan. The aircraft may comprise a gas turbine engine. If so, the load may include a motor configured to drive a spool or a fan of the gas turbine engine.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only with reference to the accompanying drawings, which are purely schematic and not to scale, and in which.

DETAILED DESCRIPTION

Figure 1:
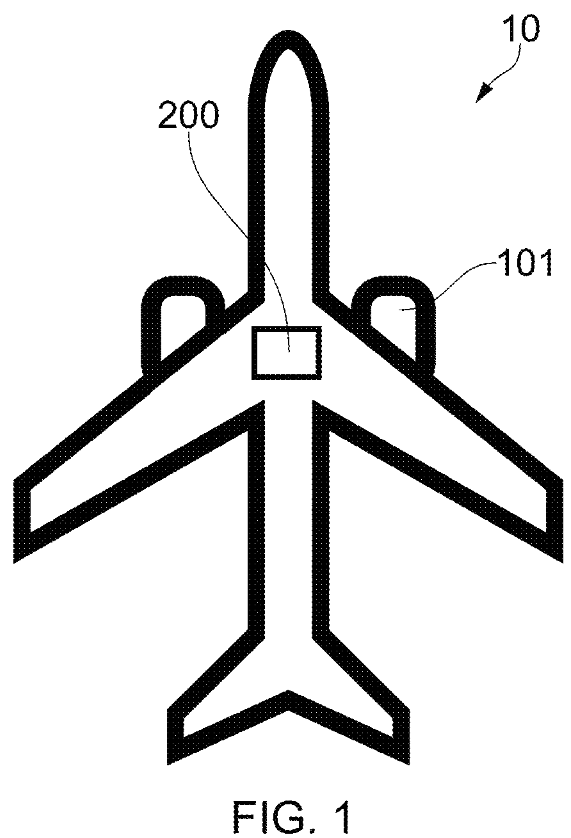
FIG. 1 is a highly schematic view of an aircraft comprising a gas turbine engine and an electrical system.

FIG. 1 shows a schematic plan view of an aircraft 10. The aircraft 10 comprises an electrical system 200 in accordance with the example electrical system 200 described below with reference to FIG. 3. The aircraft 10 may also comprise a gas turbine engine 101. The gas turbine engine 101 may generally be in accordance with the gas turbine engine 10 described below with reference to FIG. 2. Otherwise, the aircraft 200 may be provided with an alternative propulsive device, such as a propellor or a fan configured to be driven by an electric motor.

Figure 2:
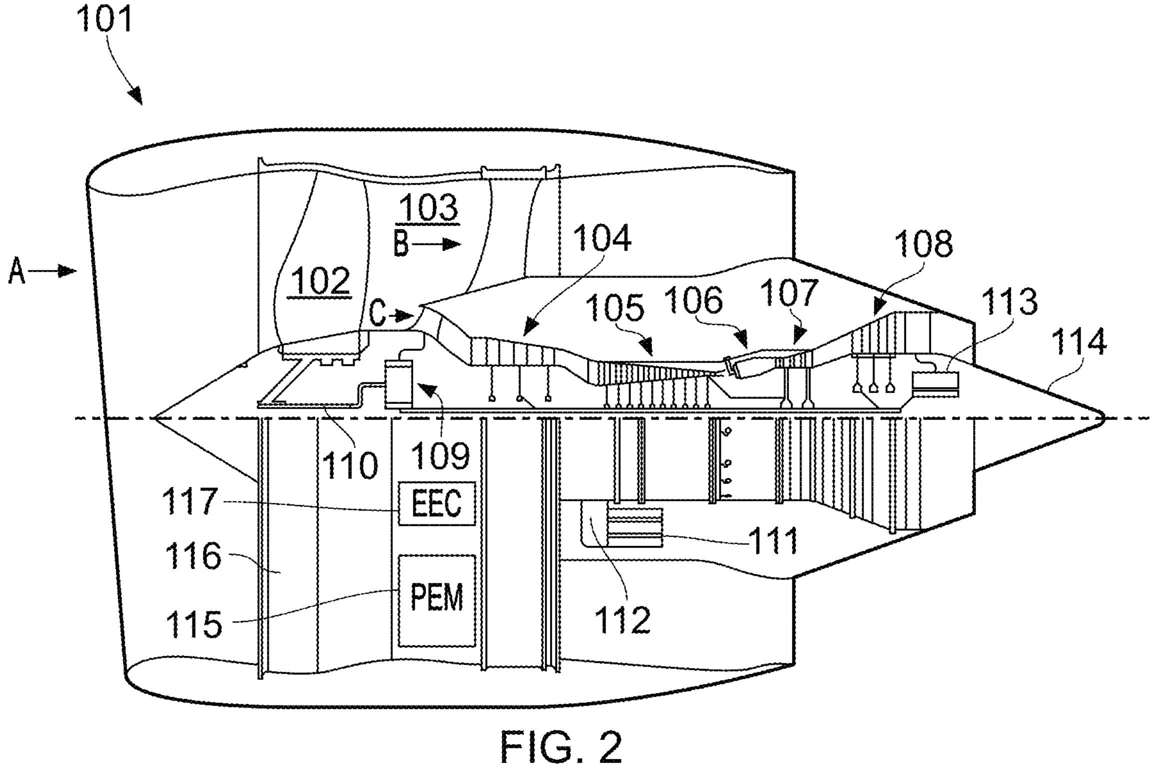
FIG. 2 shows a general arrangement of a turbofan engine suitable for use with the aircraft of FIG. 1.

A general arrangement of an engine 101 for an aircraft is shown in FIG. 2. The engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art. Those skilled in the art will also appreciate that whilst the illustrated engine has two spools, other gas turbine engines have a different number of spools, e.g., three spools.

The fan 102 is driven by the low-pressure turbine 108 via a reduction gearbox in the form of a planetary-configuration epicyclic gearbox 109. Thus in this configuration, the low-pressure turbine 108 is connected with a sun gear of the gearbox 109. The sun gear is meshed with a plurality of planet gears located in a rotating carrier, which planet gears are in turn meshed with a static ring gear. The rotating carrier drives the fan 102 via a fan shaft 110. It will be appreciated that in alternative embodiments a star-configuration epicyclic gearbox (in which the planet carrier is static and the ring gear rotates and provides the output) may be used instead, and indeed that the gearbox 109 may be omitted entirely so that the fan 102 is driven directly by the low-pressure turbine 108.

It is increasingly desirable to facilitate a greater degree of electrical functionality on the airframe and on the engine. To this end, the engine 101 of the present embodiment comprises one or more rotary electric machines, generally capable of operating both as a motor and as a generator. The number and arrangement of the rotary electric machines will depend to some extent on the desired functionality. Some embodiments of the engine 101 include a single rotary electric machine 111 driven by the high-pressure spool, for example by a core-mounted accessory drive 112 of conventional configuration. Such a configuration facilitates the generation of electrical power for the engine and the aircraft and the driving of the high-pressure spool to facilitate starting of the engine in place of an air turbine starter. Other embodiments, including the one shown in FIG. 1, comprise both a first rotary electric machine 111 coupled with the high-pressure spool and a second rotary electric machine 113 coupled with the low pressure spool. In addition to generating electrical power and the starting the engine 101, having both first and second rotary machines 111, 113, connected by power electronics, can facilitate the transfer of mechanical power between the high and lower pressure spools to improve operability, fuel consumption etc.

As mentioned above, in FIG. 1 the first rotary electric machine 111 is driven by the high-pressure spool by a core-mounted accessory drive 112 of conventional configuration. In alternative embodiments, the first electric machine 111 may be mounted coaxially with the turbomachinery in the engine 101. For example, the first electric machine 111 may be mounted axially in line with the duct between the low- and high-pressure compressors 104 and 105. In FIG. 1, the second electric machine 113 is mounted in the tail cone 114 of the engine 101 coaxially with the turbomachinery and is coupled to the low-pressure turbine 108. In alternative embodiments, the second rotary electric machine 113 may be located axially in line with low-pressure compressor 104, which may adopt a bladed disc or bladed drum configuration to provide space for the second rotary electric machine 113. It will of course be appreciated by those skilled in the art that any other suitable location for the first and (if present) second electric machines may be adopted.

The first and second electric machines 111, 113 are connected with power electronics. Extraction of power from or application of power to the electric machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electric machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e., both of the core gas turbine and the first and second electric machines 111 and 113. In this way, the EEC 117 may holistically respond to both thrust demand and electrical power demand.

The one or more rotary electric machines 111, 113 and the power electronics 115 may be configured to output to or receive electric power from one, two or more DC busses. The DC busses allow for the distribution of electrical power to other engine electrical loads and to electrical loads on the airframe. The DC busses may further receive electrical power from, or deliver electrical power to, an energy storage system such as one or more battery modules or packs.

Those skilled in the art will appreciate that the gas turbine engine 101 described above may be regarded as a 'more electric' gas turbine engine because of the increased role of the electric machines 111, 113 compared with those of conventional gas turbines.

Figure 3:
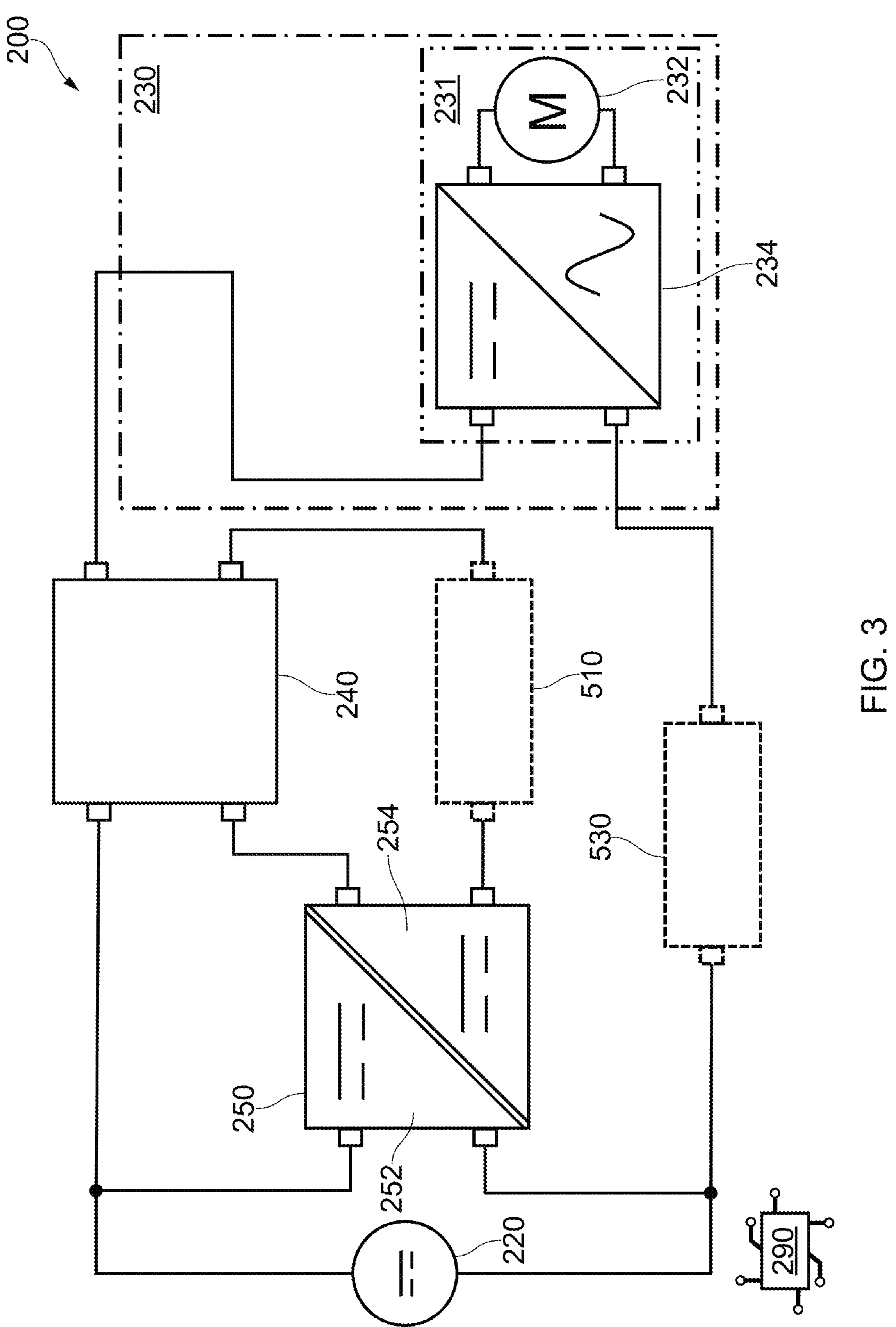
FIG. 3 is a highly schematic diagram which shows a first example electrical system comprising a DC source, a bus comprising a load, a switching arrangement, a DC-DC converter and a control system.

FIG. 3 is high-level circuit diagram which shows a first example electrical system 200. The electrical system 200 comprises a DC source 220, a bus 230, a switching arrangement 240, a DC-DC converter 250 and a control system 290. The bus 230 is electrically coupled in series to the DC source 220. The switching arrangement 240 is electrically coupled to each of the DC source 220 and the bus 230.

The DC source 220 is configured to provide (e.g., output) a DC electrical power. To this end, the DC source 220 may comprise a battery. If so, it may be that the battery comprises a plurality of battery-cells connected in series and/or in parallel, as will be appreciated by those skilled in the art. Each battery-cell may be, for example, a lithium-ion battery-cell. If so, the battery 210 may be referred to as a lithium-ion battery 210. Otherwise, each battery-cell may be a sodium-ion battery-cell, a solid-state battery-cell or a lithium-sulphur battery cell, or any suitable battery type.

In addition or instead, the DC source may comprise a fuel-cell pack. If so, it may be that the fuel-cell pack comprises a plurality of fuel-cells connected in series and/or in parallel. Each fuel-cell may be, for example, a hydrogen-based fuel-cell. If so, the fuel-cell pack may be referred to as a hydrogen fuel-cell pack. However, this disclosure envisages that other types of fuel-cells may be used for the fuel-cell pack.

The bus 230 comprises a load 231. The load 231 is generally configured to be driven by (that is, receive power for operation from) the DC source 220. In the example of FIG. 3, the load 231 comprises an AC electrical component 232 and a DC-AC converter 234 configured to receive DC power from the DC source 220 (e.g., via the DC-DC converter 250 and/or switching arrangement 240) and to provide AC power to the AC electrical component 232. In the example of FIG. 3, the AC electrical component 232 is an AC motor 232. However, in other examples, the load 231 may not comprise a DC-AC converter and/or an AC electrical component. For instance, the load 231 may otherwise comprise one or more DC electrical components, such as a DC motor.

If the electrical system 200 is incorporated within an aircraft 10, as described above with reference to FIG. 1, the electrical component may be configured to drive a mechanical device of the aircraft 200. By way of example, if the electrical component 232 is a motor, the motor 232 may be configured to drive a propulsive device (not shown) of the aircraft 200, such as a propellor or a fan for the aircraft 200. Optionally, if the aircraft 200 comprises a gas turbine engine 101, the motor 232 may be configured to drive a spool or a fan 102 of the gas turbine engine 101 of the aircraft 200. Specifically, the motor 232 may form a part of either of the electric machines 111, 113 described above with respect to FIG. 2. Optionally, the bus 230 may also comprise an additional electrical source (e.g., an auxiliary electrical source). If the bus 230 comprises an additional DC source, the load 231 may be configured to be driven by (that is, receive power for operation from) the additional DC source in addition to, or instead of, the DC source 220.

It may be that the bus 230 is associated with a design operating voltage. The design operating voltage of the bus 230 may be a rated operating voltage value or an ideal (e.g. optimal or target) operating voltage value for operation of the load 231. Additionally or alternatively, it may be that the bus 230 is associated with a design operating voltage range defined by (e.g., between) a lower design operating voltage and an upper design operating voltage. Each design operating threshold may be an upper or a lower rated voltage value or an upper or a lower ideal (e.g. optimal or target) voltage value, respectively, for operation of the load 231. Either of the upper design operating voltage or the lower operating voltage may be simply referred to as the design operating voltage herein.

The DC-DC converter 250 comprises an input side 252 and an output side 254. The DC-DC converter 250 is generally configured to convert a DC voltage at a first magnitude supplied to the input side 252 of the DC-DC converter 250 to a DC voltage at a second magnitude for supply from the output side 254 of the DC-DC converter. A ratio between the first magnitude and the second magnitude may be referred to as a conversion ratio of the DC-DC converter 250. The conversion ratio of the DC-DC converter 250 is controllable by the control system 290 as described in further detail herein. If the conversion ratio of the DC-DC converter 250 is greater than unity, the DC-DC converter 250 performs a boost (or a step-up) function in use. On the other hand, if the conversion ratio of the DC-DC converter is less than unity, the DC-DC converter 250 performs a buck (or a step-down) function in use. Preferably, the conversion ratio of the DC-DC converter may be maintained at or below unity in use (e.g., such that the DC-DC converter 250 performs the step-down function).

It may be that the DC-DC converter 250 is an isolated DC-DC converter 250 which includes a transformer having an input coil 259' and an output coil 259" (best shown in FIG. 4), with the input side 252 of the DC-DC converter 250 comprising the input coil 259' of the transformer and the output side 254 of the DC-DC converter 250 comprising the output coil 259" of the transformer. If so, the input side 252 of the DC-DC converter 250 is galvanically isolated from the output side 254 of the DC-DC converter 250, but the input side 252 of the DC-DC converter 250 is electromagnetically coupled to the output side 254 of the DC-DC converter 250 by the transformer.

The control system 290 is generally configured to operate the switching arrangement 240 to selectively configure (and reconfigure) the electrical system 200 in a plurality of modes (i.e. in each of such modes, individually). The plurality of modes include a voltage increase mode, a voltage decrease mode, and a converter isolation mode. The converter isolation mode may also be referred to as a converter isolation mode.

The voltage increase mode and the voltage decrease mode may each be considered to be a converter-connected mode, and so the control system 290 can be described as configured to operate the switching arrangement 240 in the converter isolation mode and a converter-connected mode. In the particular examples described below, the plurality of modes includes both the voltage increase mode and the voltage decrease mode (i.e. both of the converter connected modes), but in other examples the control system 290 and/or switching arrangement 240 may be configured to configure (and reconfigure) the electrical system in only one of the converter connected modes.

When the electrical system 200 is configured in each of the voltage increase mode and the voltage decrease mode, the input side 252 of the DC-DC converter 250 is (directly or indirectly) coupled to the DC source 220. Specifically, the input side of the DC-DC converter 250 is coupled in parallel with respect to the DC source 220 in each of the voltage increase mode and the voltage decrease mode. Accordingly, the input side 252 of the DC-DC converter receives a part of the current provided by the DC source 220 in each of the voltage increase mode and the voltage decrease mode, per Kirchhoff's current law. Therefore, regardless of which mode the electrical system 200 is configured in, the input side 252 of the DC-DC converter 250 is configured to receive only a fraction of the DC electrical power provided by the DC source 220, with the fraction being less than unity (i.e. a proper fraction, or if expressed as a percentage, a percentage less than 100% or less than 90%). By configuring the input side 252 of the DC-DC converter 250 to only receive less than 100% of the electrical power provided by the DC source 220, a size and/or a power rating of the internal components (such as an inductor or a transformer) of the DC-DC converter 250 is enabled to be relatively decreased, which may reduce a size and/or a weight of the DC-DC converter 250 and the electrical system 200 overall.

In the first example electrical system 200 shown in FIG. 3, the input side 252 of the DC-DC converter 250 is coupled in parallel with respect to the DC source 220 between the DC source 220 and the switching arrangement 240. It follows that, when the electrical system 200 is operated in either the voltage increase mode or the voltage decrease mode, the voltage received by the input side 252 of the DC-DC converter 250 is substantially equal to a voltage across the DC source 220 (that is, the voltage of the electrical power provided by the DC source 220).

When the electrical system 200 is configured in the voltage increase mode, the output side 254 of the DC-DC converter 250 is coupled in series with respect to the DC source 220 and the bus 230 via the switching arrangement 240 such that a voltage supplied to the bus 230 by the switching arrangement 240 is substantially equal to a sum of the voltage supplied from the output side 254 of the DC-DC converter 254 and the voltage across the DC source 220. That is, the voltage supplied to the bus 230 by the switching arrangement 240 corresponds to addition of the voltage supplied from the output side 254 of the DC-DC converter 254 and the voltage across the DC source 220. Consequently, when the electrical system 200 is configured in the voltage increase mode, the output side 254 of the DC-DC converter 250 is coupled to the DC source 220 and the bus 230 for increasing the voltage supplied to the bus 230. As a result, the control system 290 is able to control the voltage supplied to the bus 230 by varying the conversion ratio of the DC-DC converter 250 when the electrical system 200 is configured in the voltage increase mode.

When the electrical system 200 is configured in the voltage decrease mode, the output side 254 of the DC-DC converter 250 is coupled in series with respect to the DC source 220 and the bus 230 via the switching arrangement 240 such that the voltage supplied to the bus 230 by the switching arrangement 240 is substantially equal to a difference between the voltage across the DC source 220 and the voltage supplied from the output side 254 of the DC-DC converter 254. Consequently, when the electrical system 200 is configured in the voltage decrease mode, the output side 254 of the DC-DC converter 250 is coupled to the DC source 220 and the bus 230 for decreasing the voltage supplied to the bus 230. As a result, the control system 290 is able to control the voltage supplied to the bus 230 by varying the conversion ratio of the DC-DC converter 250 when the electrical system 200 is configured in the voltage decrease mode.

More specifically, when the first example electrical system 200 is configured in the voltage increase mode, the control system 290 is able to vary the voltage supplied to the bus 230 within a range extending between the voltage across the DC source 220 (e.g., when the conversion ratio of the DC converter 250 is substantially equal to, or approaching, zero) and a high voltage having the same sign as the voltage across the DC source 220 (e.g., when the conversion ratio of the DC converter 250 increases toward a large value).

Conversely, when the first example electrical system 200 is configured in the voltage decrease mode, the control system 290 is able to vary the voltage supplied to the bus 230 within a range extending between the voltage across the DC source 220 (e.g., when the conversion ratio of the DC converter 250 is substantially equal to zero) and a high voltage having the opposite sign to the voltage across the DC source 220 (e.g., when the conversion ratio of the DC converter 250 increases toward a large value).

When the electrical system 200 is configured in the converter isolation mode, the DC-DC converter 250 is functionally (e.g., electrically) decoupled from at least one or both of the DC source 220 and the bus 230, and may be referred to as inactive (e.g. in an inactive state). To achieve this, the input side 252 of the DC-DC converter 250 may be decoupled from at least one of the DC source 220 and the bus 230, and/or the output side 254 of the DC-DC converter 250 may be decoupled from at least one of the DC source 200 and the bus 230. Therefore, the DC-DC converter 250 is not able to (and, in use, does not) either relatively increase the voltage supplied to the bus 230 or relatively decrease the voltage supplied to the bus 230 when the electrical system 200 is configured in the converter isolation mode.

The control system 290 is configured to operate the electrical system in accordance with the example method 700 described below with reference to FIG. 9. However, description of the electrical system 200 itself now continues with references to FIGS. 5-8, which are circuit diagrams which show respective example electrical topologies 201, 202, 201', 202' suitable for the first example electrical system 200 of FIG. 3 or the second example electrical system 200' of FIG. 4.

Figure 4:
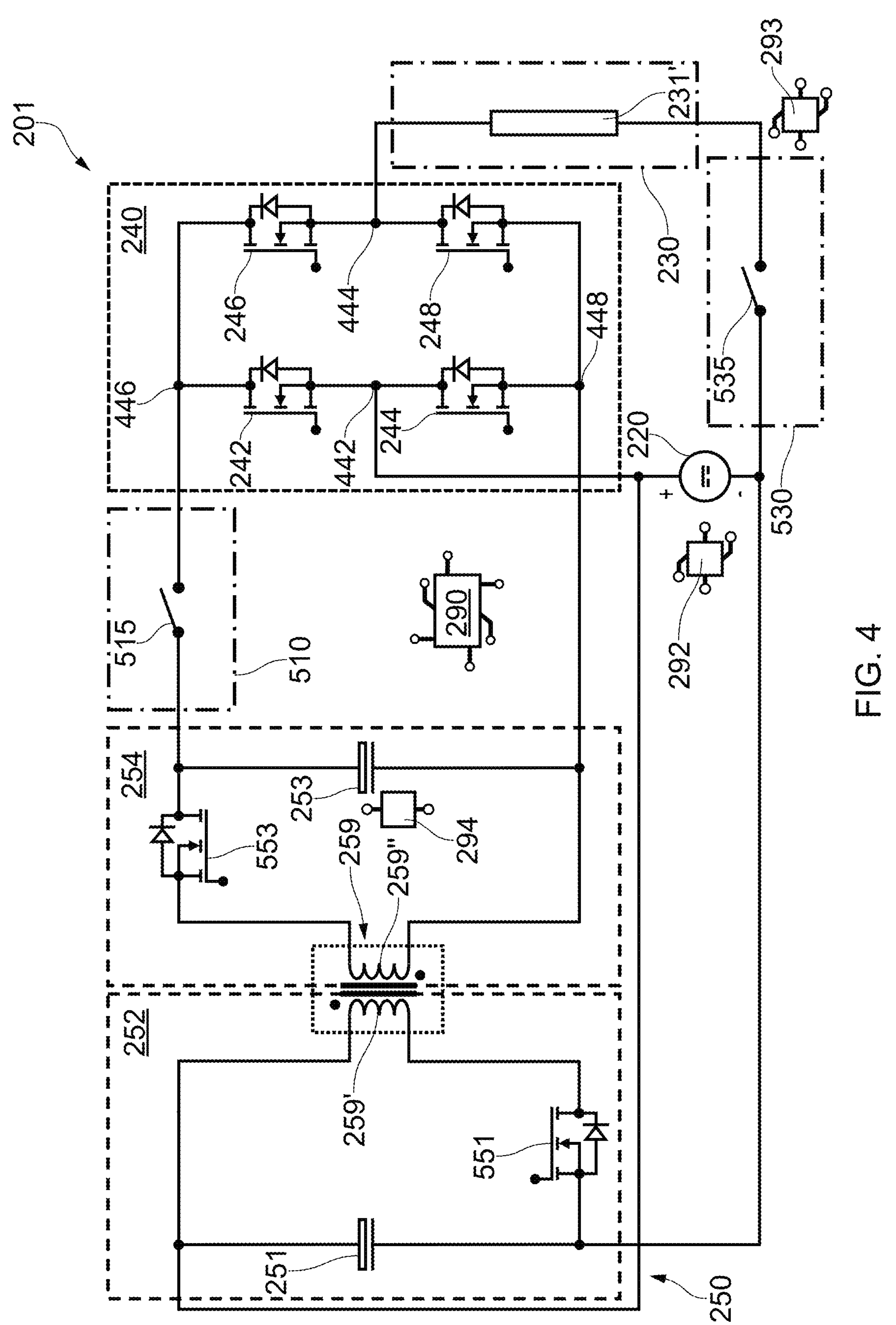
FIG. 4 is a circuit diagram which shows a first example electrical topology of the first example electrical system of FIG. 3.

FIG. 4 is circuit diagram which shows a first example electrical topology 201 for the electrical system 200 of FIG. 3, with like reference numerals denoting common features.

In the example topology 201 of FIG. 4, the switching arrangement 240 includes a total of four switching devices 242, 244, 246, 248. The switching devices 242, 244, 246, 248 are arranged into a first pair 242, 244 and a second pair 246, 248. The first pair of switching devices 242, 244 are coupled in series to one another through a first junction 442, whereas the second pair of switching devices 246, 248 are coupled in series to one another through a second junction 444. In addition, the first pair of switching devices 242, 244 and the second pair of switching devices 246, 248 are coupled to each other in parallel with respect to a pair of converter connection terminals comprising a first converter connection terminal 446 and a second converter connection terminal 448.

The first pair of switching devices 242, 244 comprises a first primary switching device 242 and a first secondary switching device 244. The first primary switching device 242 is relatively proximal to the first converter connection terminal 446 (compared to the first secondary switching device 244) whereas the first secondary switching device 244 is relatively proximal to the second converter connection terminal 448 (compared to the first primary switching device 242). Similarly, the second pair of switching devices 246, 248 comprises a second primary switching device 246 and a second secondary switching device 248. The second primary switching device 246 is relatively proximal to the first converter connection terminal 446 (compared to the second secondary switching device 248) whereas the second secondary switching device 248 is relatively proximal to the second converter connection terminal 448 (compared to the second primary switching device 246).

In the example of FIG. 4, each switching device 242, 244, 246, 248 is a semiconductor-based power switching device. Each switching device 242, 244, 246, 248 may include, for example, a transistor or a thyristor. In particular, each switching 242, 244, 246, 248 device may include any of a field-effect transistor (e.g. a metal-oxide-semiconductor field-effect transistor (MOSFET), as shown in the example FIG. 4), a gate turn-off thyristor, integrated-gate bipolar transistor, an integrated gate-commutated thyristor, an injection-enhanced gate transistor and/or any suitable switching device type. Each switching device 242, 244, 246, 248 being a semi-conductor based power switching device may provide a lighter and/or more responsive electrical system 200, which may be particularly advantageous in, but not limited to, the context of aerospace applications.

The output side 254 of the DC-DC converter 250 is coupled to the switching arrangement 240 via the first converter connection terminal 446 and the second converter connection terminal 448. Further, the DC source 220 and the bus 230 are coupled to the switching arrangement 240 at the first junction 442 and the second junction 444. In the example topology 201 of FIG. 4, the bus 230 is represented as comprising a resistive load element 231'. However, it will be appreciated that the bus 230 may comprise at least a partially resistive, a partially capacitive and/or a partially inductive load 231'.

Each switching device 242, 244, 246, 248 is operable by the control system 290 in, and to move between, an open state and a closed state. In the open state, the respective switching device 242, 244, 246, 248 does not allow conduction (e.g., flow) of a current therethrough (e.g., subject to the operational condition of any internal components such as a body diode, as will be appreciated by those skilled in the art). In the closed state, the respective switching device 242, 244, 246, 248 allows conduction (e.g., flow) of a current therethrough. The control system 290 is configured to selectively configure (and reconfigure) the electrical system 200 in each of the voltage decrease mode, the voltage increase mode and the converter isolation mode by operating each switching device 242, 244, 246, 248 in either the open state or the closed state as follows.

The electrical system 200 may be configured in the converter isolation mode by operating the switching devices 242, 244, 246, 248 so that, for one or both of the converter connection terminals 446, 448, the switching device of the first pair which is proximal to the respective converter connection terminal and the switching device of the second pair which is proximal to the respective converter connection terminal are both operated in the closed state.

For example, the electrical system 200 may be configured in the converter isolation mode by operating the first primary switching device 242 and the second primary switching device 246 in the open state and concurrently operating the first secondary switching device 244 and the second secondary switching device 248 in the closed state. If so, a conduction path (e.g., a closed circuit) is formed between the DC source 220 and the bus 230 through, in sequence, the first junction 442, the first secondary switching device 244, the second converter connection terminal 448, the second secondary switching device 248 and the second junction 444 such that the DC source 220 is coupled to the bus 230 for driving of the load 231 by the DC source 220. However, no conduction path is formed between the DC source 220 and the output side 254 of the DC-DC converter 250 or between the bus 230 and the output side 254 of the DC-DC converter 250 such that the output side 254 of the DC-DC converter 250 is functionally (e.g. electrically) decoupled from the DC source 220 and the bus 230.

Equally, the electrical system 200 may be configured in the converter isolation mode by operating the first primary switching device 242 and the second primary switching device 246 in the closed state and concurrently operating the first secondary switching device 244 and the second secondary switching device 248 in the open state. If so, a conduction path (e.g., a closed circuit) is formed between the DC source 220 and the bus 230 through, in sequence, the first junction 442, the first primary switching device 242, the first converter connection terminal 446, the second primary switching device 246 and the second junction 444 such that the DC source 220 is coupled to the bus 230 for driving of the load 231 by the DC source 220. Nevertheless, no conduction path is formed between the DC source 220 and the output side 254 of the DC-DC converter 250 or between the bus 230 and the output side 254 of the DC-DC converter 250 such that the output side 254 of the DC-DC converter 250 is functionally decoupled from the DC source 220 and the bus 230. As mentioned above, when all of the switching devices 242, 244, 246, 248 are operated in the closed state, both conduction paths discussed above are operational to form a closed circuit for operation in the converter isolation mode, and the output side 254 of the converter may be separately isolated from the conduction paths by a converter fault isolation arrangement 510 as described in further detail below with reference to FIG. 5.

The electrical system 200 may be configured in the voltage decrease mode by operating the first secondary switching device 244 and the second primary switching device 246 in the open state and concurrently operating the first primary switching device 242 and the second secondary switching device 248 in the closed state. If so, a conduction path (e.g., a closed circuit) is formed between the DC source 220, the output side 254 of the DC-DC converter 250 and the bus 230 through, in sequence, the first junction 442, the first primary switching device 242, the first converter connection terminal 446, the output side 254 of the DC-DC converter 250, the second converter connection terminal 448, the second secondary switching device 248, and the second junction 444 such that the output side 254 of the DC-DC converter 250 is coupled in series to the DC source 220 and the bus 230. In particular, in the voltage decrease mode the electrical polarity of the output side 254 of the DC-DC converter 250 is orientated with respect to the electrical polarity of the DC source 220 such that the positive pole of the DC source 220 is electrically coupled in series to the positive terminal of the output side 254 of the DC-DC converter and vice versa. This may be referred to as a first orientation of the polarity of the output side 254 of the DC-DC converter 250 with respect to the polarity of the DC source 220, suitable for decreasing the voltage supplied to the bus 230. As a result, the output side of the DC-DC converter is coupled to the DC source and the bus by the switching arrangement 240 such that, in use, the switching arrangement 240 supplies a voltage to the bus 230 which is substantially equal to a difference between the voltage across the DC source 220 and a voltage across the output side 254 of the DC-DC converter 250.

The electrical system 200 may be configured in the voltage increase mode by operating the first primary switching device 242 and the second secondary switching device 248 in the open state and concurrently operating the first secondary switching device 244 and the second primary switching device 246 in the closed state. If so, a conduction path (e.g., a closed circuit) is formed between the DC source 220, the output side 254 of the DC-DC converter 250 and the bus 230 through, in sequence, the first junction 442, the first secondary switching device 244, the second converter connection terminal 448, the output side 254 of the DC-DC converter 250, the first converter connection terminal 446, the second primary switching device 246, and the second junction 444 such that the output side 254 of the DC-DC converter 250 is coupled in series to the DC source 220 and the bus 230 for increasing the voltage supplied to the bus 230. In particular, the electrical polarity of the output side 254 of the DC-DC converter 250 is orientated with respect to the electrical polarity of the DC source 220 such that a positive pole of the DC source 220 is electrically coupled in series to a negative terminal of the output side 254 of the DC-DC converter 250 while a negative pole of the DC source 220 is electrically coupled in series to a positive terminal of the output side 254 of the DC-DC converter 254 through the bus 230. This may be referred to as a second orientation of the polarity of the output side 254 of the DC-DC converter 250 with respect to the polarity of the DC source 220, suitable for increasing the voltage supplied to the bus 230, with the second orientation opposing the first orientation described above with reference to the voltage decrease mode. As a consequence, the output side of the DC-DC converter is coupled to the DC source and the bus by the switching arrangement 240 such that, in use, the switching arrangement 240 supplies a voltage to the bus 230 which is substantially equal to a sum of the voltage across the DC source 220 and the voltage across the output side 254 of the DC-DC converter 250.

In the first example electrical topology 201 of the electrical system 200, the DC-DC converter 250 is a flyback DC-DC converter. To this end, the DC-DC converter 250 comprises a transformer 259 between the input and output sides 252, 254. The input side 252 of the flyback DC-DC converter 250 comprises a first flyback input switching device 551, an input coil 259' of the transformer 259 and an input capacitor 251 whereas the output side 254 of the flyback DC-DC converter 250 comprises a first flyback output switching device 553, an output coil 259" of the transformer 259 and an output capacitor 253. The first flyback input switching device 551 and the input coil 259' of the transformer 259 are connected in series with respect to each other, while the input capacitor 251 is connected in parallel with respect to the first flyback input switching device 551 and the input coil 259' of the transformer 259. Similarly, the first flyback output switching device 553 and the output coil 259" of the transformer 259 are connected in series with respect to each other, while the output capacitor 253 is connected in parallel with respect to the first flyback output switching device 553 and the output coil 259" of the transformer 259. As will be appreciated by those of ordinary skill in the art, a duty cycle of the first flyback input switching device 551 may be controlled by the control system 290 to vary the conversion ratio of the DC-DC converter 250. A duty cycle of the first flyback output switching device 553 may be controlled by the control system 290 accordingly.

FIG. 4 also shows a DC source monitoring arrangement 292 and a bus monitoring sensing arrangement 293. The DC source monitoring (e.g., sensing) arrangement 292 is configured to monitor the voltage across the DC source 220, as discussed in further detail below. The bus monitoring (e.g., sensing) arrangement 293 is configured to monitor the voltage across the bus 230, as also discussed in further detail below. Further, FIG. 4 shows a bus fault isolation arrangement 530, which is operable to isolate the DC source 220 from the bus 230, as described in further detail below with reference to FIG. 5.

Figure 5:
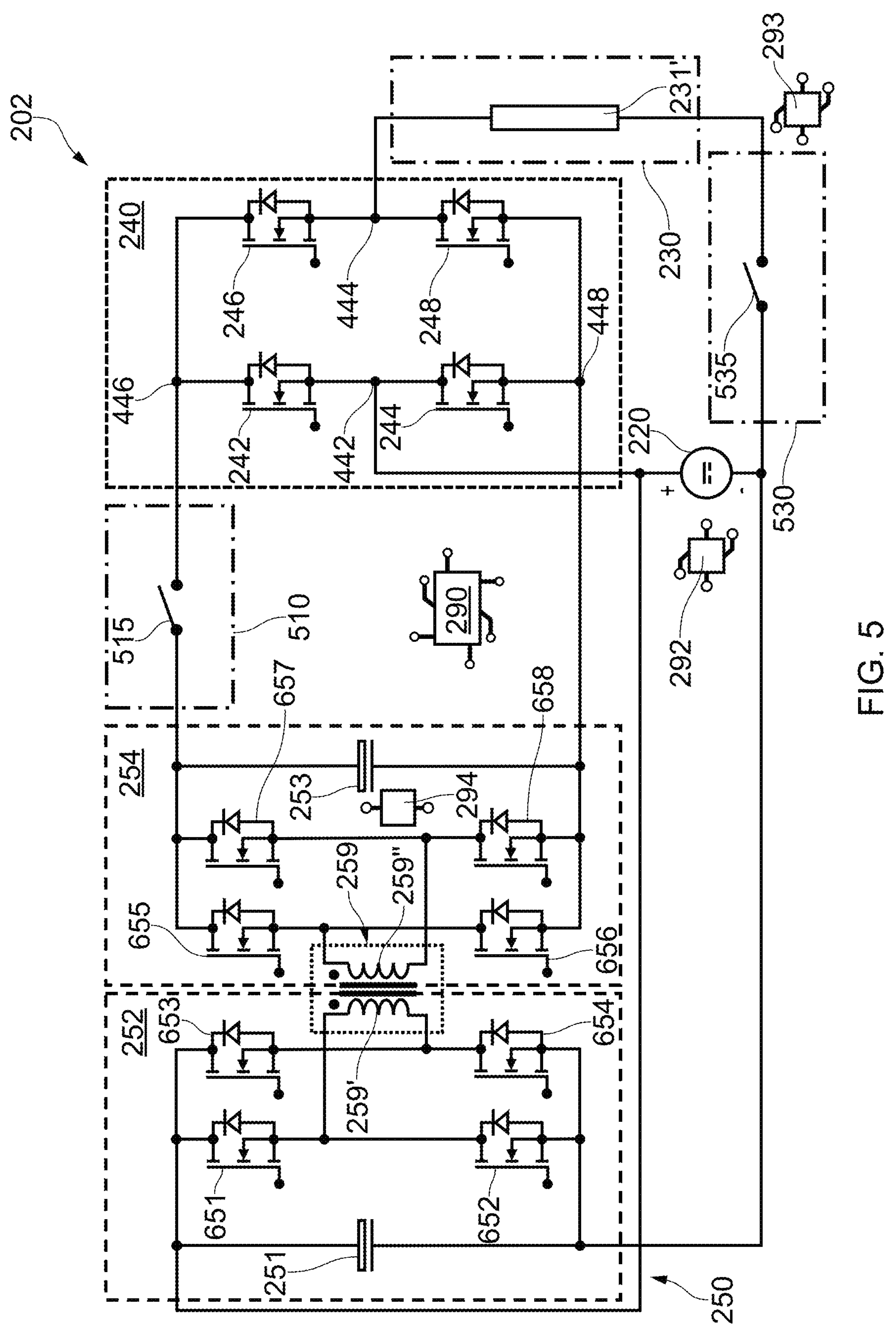
FIG. 5 is a circuit diagram which shows a second example electrical topology of the first example electrical system of FIG. 3.

FIG. 5 is circuit diagram which shows a second example electrical topology 202 for the electrical system 200 of FIG. 3. The second example electrical topology 202 is generally similar to both the first example electrical topology 201 described above with reference to FIG. 4, with like reference numerals denoting common or similar features.

However, in the second example electrical topology 202 of the electrical system 200, the DC-DC converter 250 is a dual active bridge converter. To this end, the input side 252 of the DC-DC converter 250 comprises a plurality of input bridge switching devices and the input coil 259' of the transformer 259. The plurality of input bridge switching devices includes a first input bridge switching device 651, a second input bridge switching device 652, a third input bridge switching device 653, and a fourth input bridge switching device 654.

Likewise, the output side 254 of the DC-DC converter 250 comprises a plurality of output bridge switching devices and the output coil 259" of the transformer 259. The plurality of output bridge switching devices includes a first output bridge switching device 655, a second output bridge switching device 656, a third output bridge switching device 657, and a fourth output bridge switching device 658.

As will be recognisable to those skilled in the art, the plurality of input bridge switching devices and the input coil 259' of the transformer 259 are mutually connected to each other, according to a typical dual active bridge converter arrangement. As will also be recognisable to those skilled in the art, the plurality of output bridge switching devices and the output coil 259" of the transformer 259 are mutually connected to each other according to a typical dual active bridge converter arrangement.

An operating parameter of each of the plurality of input bridge switching devices (e.g. a duty cycle and/or a switching frequency) may be controlled by the control system 290 to vary the conversion ratio of the DC-DC converter 250 between a small non-zero value which is less than unity, and a large non-infinite value which is greater than unity. A corresponding parameter of each of the plurality of output bridge switching devices (e.g. a duty cycle and/or a switching frequency) may be controlled by the control system 290 accordingly.

Each of the first example electrical topology 201 and the second example electrical topology 202 further comprises a converter fault isolation arrangement 510 and a bus fault isolation arrangement 530. The converter fault isolation arrangement 510 is operable to selectively isolate the output side 254 of the DC-DC converter 250 from the switching arrangement 240 and to selectively couple the output side 254 of the DC-DC converter 250 to the switching arrangement 240, whereas the bus fault isolation arrangement 530 is operable to selectively isolate the bus 230 from the DC source 220 and to selectively couple the bus 230 to the DC source 220.

The converter fault isolation arrangement 510 is located between the first converter connection terminal 446 and the output side 254 of the DC-DC converter 250. However, the converter fault isolation arrangement 510 may otherwise be located between the second converter connection terminal 448 and the output side 254 of the DC-DC converter 250. The bus fault isolation arrangement 530 is located between the DC source 220 and the bus 230. However, the bus fault isolation arrangement 530 may otherwise be located between the first junction 442 and the DC source 220 or between the second junction 444 and the bus 230.

Inclusion of the converter fault isolation arrangement 510 within the electrical system 200 enables the electrical system to be operated in the converter isolation mode by operating all of the switching devices 242, 244, 246, 248 of the switching arrangement 240 in the closed state while operating the converter fault isolation arrangement 510 so as to isolate the output side 254 of the DC-DC converter 250 from the switching arrangement 240. As a consequence, a heat dissipation rate within the switching arrangement 240 may be reduced when the electrical system 200 is operated in the converter isolation mode, thereby increasing an efficiency of the electrical system 200.

In each of the first example electrical topology 201 and the second example electrical topology 202 of the first example electrical system 200, each fault isolation arrangement 510, 530 comprises a respective isolation contactor 515, 535.

This disclosure anticipates that the DC-DC converter 250 may be a forward converter, as will be generally known to those skilled in the art. By way of example, the flyback converter of the first example electrical topology 201 may be replaced by a forward converter. By way of further example, the dual active bridge converter of the second example electrical topology 202 may be replaced by a forward converter. In such examples, the DC-DC converter 250 comprises a transformer, an input capacitor and an output capacitor as described above with reference to FIGS. 4 and 5.

Figure 6:
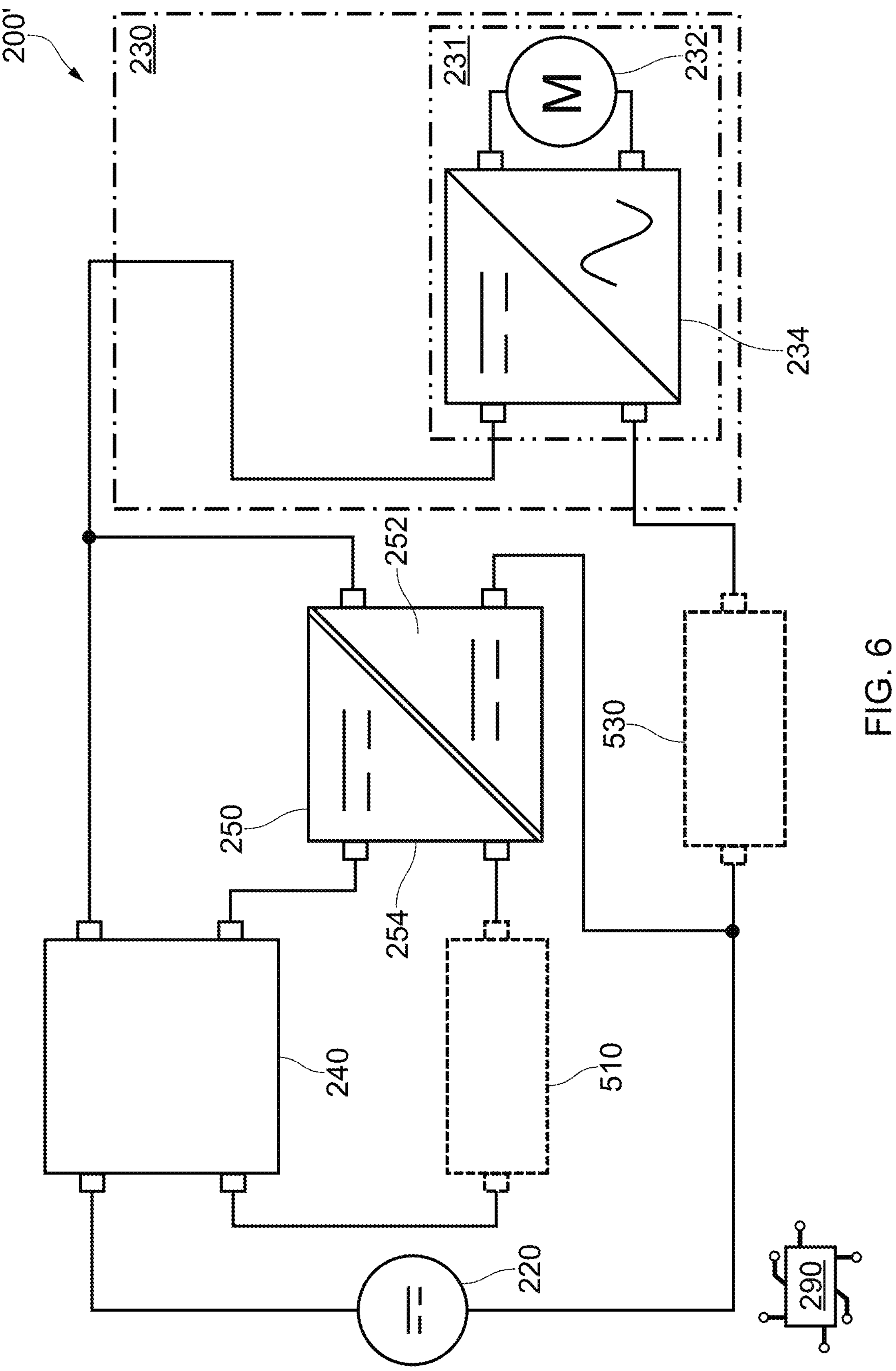
FIG. 6 is a highly schematic diagram which shows a second example electrical system comprising a DC source, a bus comprising a load, a switching arrangement, a DC-DC converter and a control system.

FIG. 6 is high-level circuit diagram which shows a second example electrical system 200'. The second example electrical system 200' is generally similar to the first example system described above with reference to FIG. 3, with like reference numerals denoting common or similar features.

Contrastingly, in the second example electrical system 200' shown in FIG. 6, the input side 252 of the DC-DC converter 250 is coupled in parallel with respect to the DC source 220 between the switching arrangement 240 and the bus 230. It follows that, when the electrical system 200' is operated in either the voltage increase mode or the voltage decrease mode, the voltage received by the input side 252 of the DC-DC converter 250 is substantially equal to the voltage supplied to the bus 230.

Namely, when the second example electrical system 200' is configured in the voltage increase mode, the control system 290 is able to vary the voltage supplied to the bus 230 within a range extending between a voltage which is slightly greater than the voltage across the DC source 220 (e.g., when the conversion ratio of the DC converter 250 is slightly greater than zero) and a high voltage having the same sign as the voltage across the DC source 220 (e.g., when the conversion ratio of the DC converter 250 increases toward a large value).

However, when the second example electrical system 200' is configured in the voltage decrease mode, the control system 290 is able to vary the voltage supplied to the bus 230 within a range extending between a voltage which is slightly less than the voltage across the DC source 220 (e.g., when the conversion ratio of the DC converter 250 is slightly greater than zero) and a voltage proportional to the voltage across the DC source 220 (e.g., when the conversion ratio of the DC converter 250 increases toward a large value).

The arrangement of the second example electrical system 200' may be preferred to the arrangement of the first example electrical system 200 of FIGS. 3-6 when the bus 230 comprises an additional electrical source (e.g. an additional DC source). If the bus 230 comprises an additional electrical source, the additional electrical source may be used to provide at least some regulation to the voltage across the bus 230. In contrast, the voltage across the DC source 220 may be subject to significant variations in use. In the second example electrical system 200', the input side 252 of the DC-DC converter 250 receives the fraction of the DC electrical power provided by the DC source 220 (approximately) at the voltage across the bus 230 rather than (approximately) at the voltage across the DC source 220. Therefore, the input side 252 of the DC-DC converter 250 may only be designed to receive a relatively narrow range and/or lower range of voltages in the second example electrical system 200' (because the voltage across the bus 230 is at least partially regulated by the additional electrical source) compared to the input side 252 of the DC-DC converter in the first example electrical system 200 (because the voltage across the DC source 220 may be subject to significant variations in use). This may reduce a weight and/or a complexity of the DC-DC converter 250, commensurate with the more narrow range of voltages.

Figure 7:
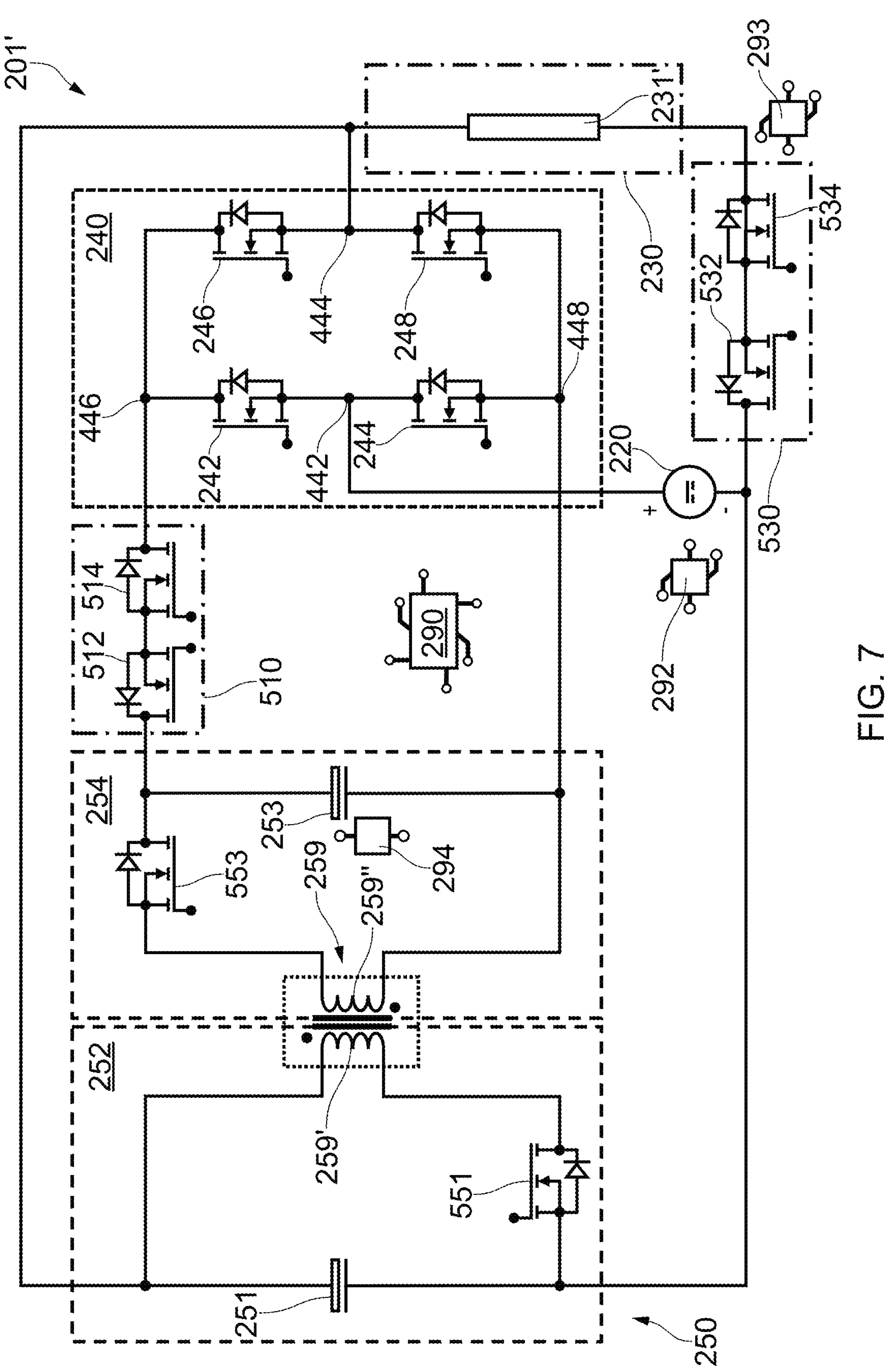
FIG. 7 is a circuit diagram which shows a first example electrical topology of the second example electrical system of FIG. 6.
Figure 8:
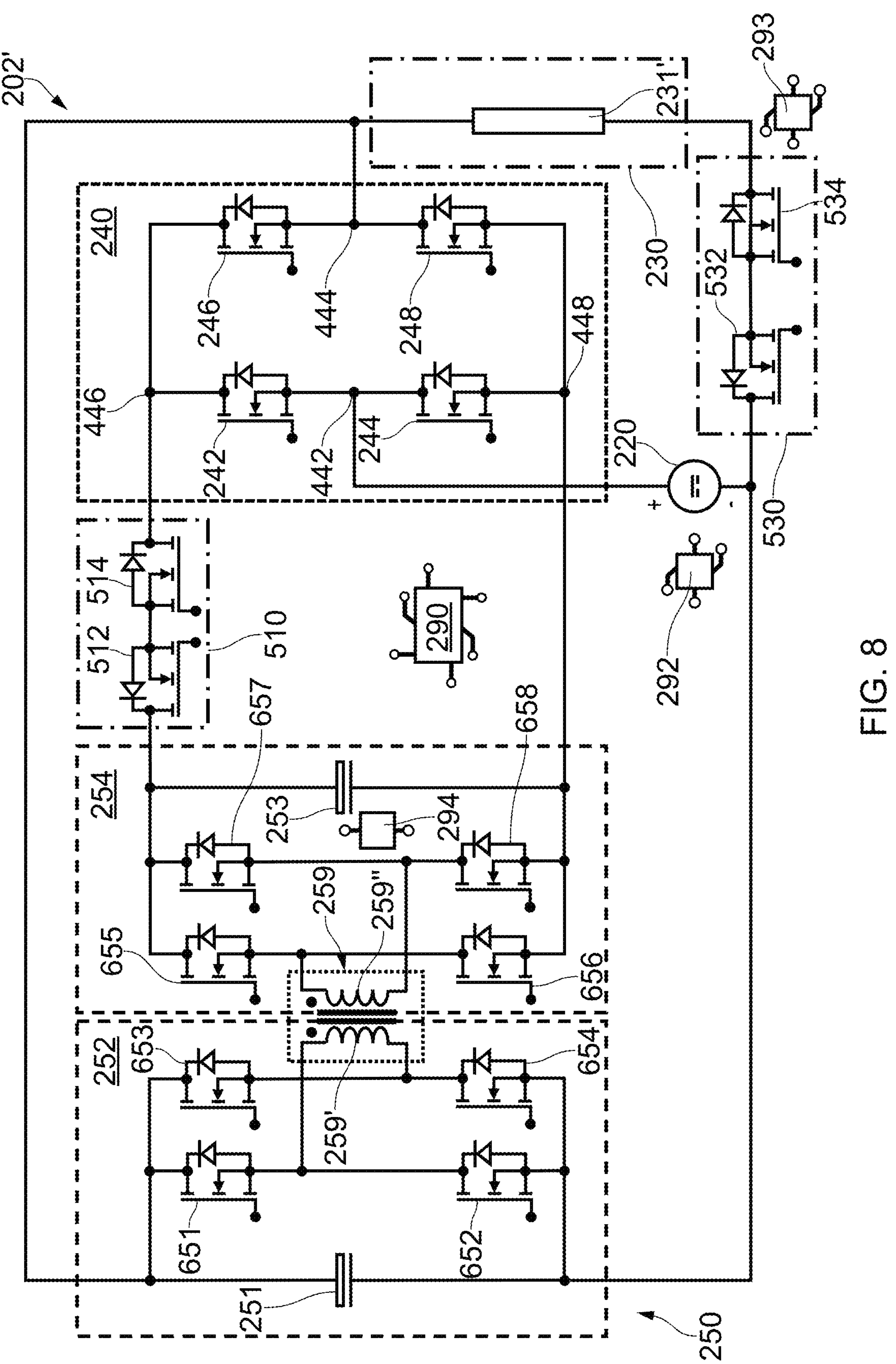
FIG. 8 is a circuit diagram which shows a second example electrical topology of the second example electrical system of FIG. 6.

FIGS. 7 and 8 are circuit diagrams which show, respectively, a first example electrical topology 201' for the second example electrical system 200' of FIG. 6 and a second example electrical topology 202' for the second example electrical system 200' of FIG. 6. The example electrical topologies 201', 202' for the electrical system 200' of FIG. 6 are generally similar to the example electrical topologies 201, 202 for the electrical system 200 of FIG. 3, with like reference numerals denoting common or similar features, but with the various differences between the first example electrical system 200 and the second example electrical system 200' of FIGS. 3 and 6, respectively, being reflected accordingly.

In each of the first example electrical topology 201' and the second example electrical topology 202' of the second example electrical system 200', each fault isolation arrangement 510, 530 comprises a respective pair of MOSFETs connected in series, with each MOSFET being provided with a body diode. That is, the converter fault isolation arrangement 510 includes a first converter isolation MOSFET 512 and a second converter isolation MOSFET 514. Likewise, the bus fault isolation arrangement 530 includes a first bus isolation MOSFET 532 and a second bus isolation MOSFET 534.

Further, each pair of MOSFETs are connected such that a source of one of the pair of MOSFETs is connected to a source of the other of the pair of MOSFETs. As a result, each fault isolation arrangement 510, 530 is configured to selectively allow current to pass through in both directions, only one direction, or in neither direction as now described in detail with respect to the converter fault isolation arrangement 510.

When both the first converter isolation MOSFET 512 is in the on state and the second converter isolation MOSFET 514 is in the on state (in a bidirectional on state of the converter fault isolation arrangement 510), current is able to pass in either direction through the converter fault isolation arrangement 510 (e.g., from the positive pole of the output side 254 of the DC-DC converter 250 to the first converter connection terminal 446 or from the first converter connection terminal 446 to the positive pole of the output side 254 of the DC-DC converter 250). Further, when both the first converter isolation MOSFET 512 is in the off state and the second converter isolation MOSFET 514 is in the off state (in a bidirectional off state of the converter fault isolation arrangement 510), current is not able to pass in either direction through the converter fault isolation arrangement 510 (e.g., from the positive pole of the output side 254 of the DC-DC converter 250 to the first converter connection terminal 446 or from the first converter connection terminal 446 to the positive pole of the output side 254 of the DC-DC converter 250) as a result of the function of the respective body diodes.

However, when the first converter isolation MOSFET 512 is in the on state and the second converter isolation MOSFET 514 is in the off state (in a first unidirectional state on of the converter fault isolation arrangement 510), current is able to pass in one direction through the converter fault isolation arrangement 510 (e.g., from the first converter connection terminal 446 to the positive pole of the output side 254 of the DC-DC converter 250). Conversely, when the first converter isolation MOSFET 512 is in the off state and the second converter isolation MOSFET 514 is in the on state (in a second on unidirectional state of the converter isolation arrangement 510), current is able to pass in the opposite direction through the converter fault isolation arrangement 510 (e.g., from the positive pole of the output side 254 of the DC-DC converter 250 to the first converter connection terminal 446).

In this way, a direction of electrical energy flow through the converter fault isolation arrangement 510, and therefore a direction of electrical energy flow between the converter connection terminals 446, 448 and the output side 254 of the DC-DC converter 250, may be selectively permitted and prevented. By operating the converter fault isolation arrangement 510 such that electrical energy may not flow from the converter connection terminals 446, 448 to the output side 254 of the DC-DC converter 250 but such that electrical energy may flow from the output side 254 of the DC-DC converter 250 to the converter connection terminals 446, 448, any electrical energy present within the bus 230 is prevented from flowing to the output side 254 of the DC-DC converter 250 via the switching arrangement 240 in use while ensuring that electrical energy may flow from the output side 254 of the DC-DC converter 250 to the bus 230 via the switching arrangement 240.

Similarly, by operating the bus fault isolation arrangement 530 such that current may not flow from the bus 230 to the DC source 220 in a first direction but such that current may flow from the bus 230 to the DC source 220 in a second direction, any electrical energy present within the bus 230 is prevented from flowing to the DC source 220 (and the output side 254 of the DC-DC converter 250 via the switching arrangement 240).

As a result, including a pair of MOSFETs 512, 514, 532, 534 connected in this manner in the converter fault isolation arrangement 510 and/or in the bus isolation arrangement 520 enables the various components of the electrical system 200 to be protected from unintended current flows in use. However, it will be appreciated that in some examples envisaged by the present disclosure, the converter fault isolation arrangement 510 may only include a single converter isolation MOSFET 512

Figure 9:
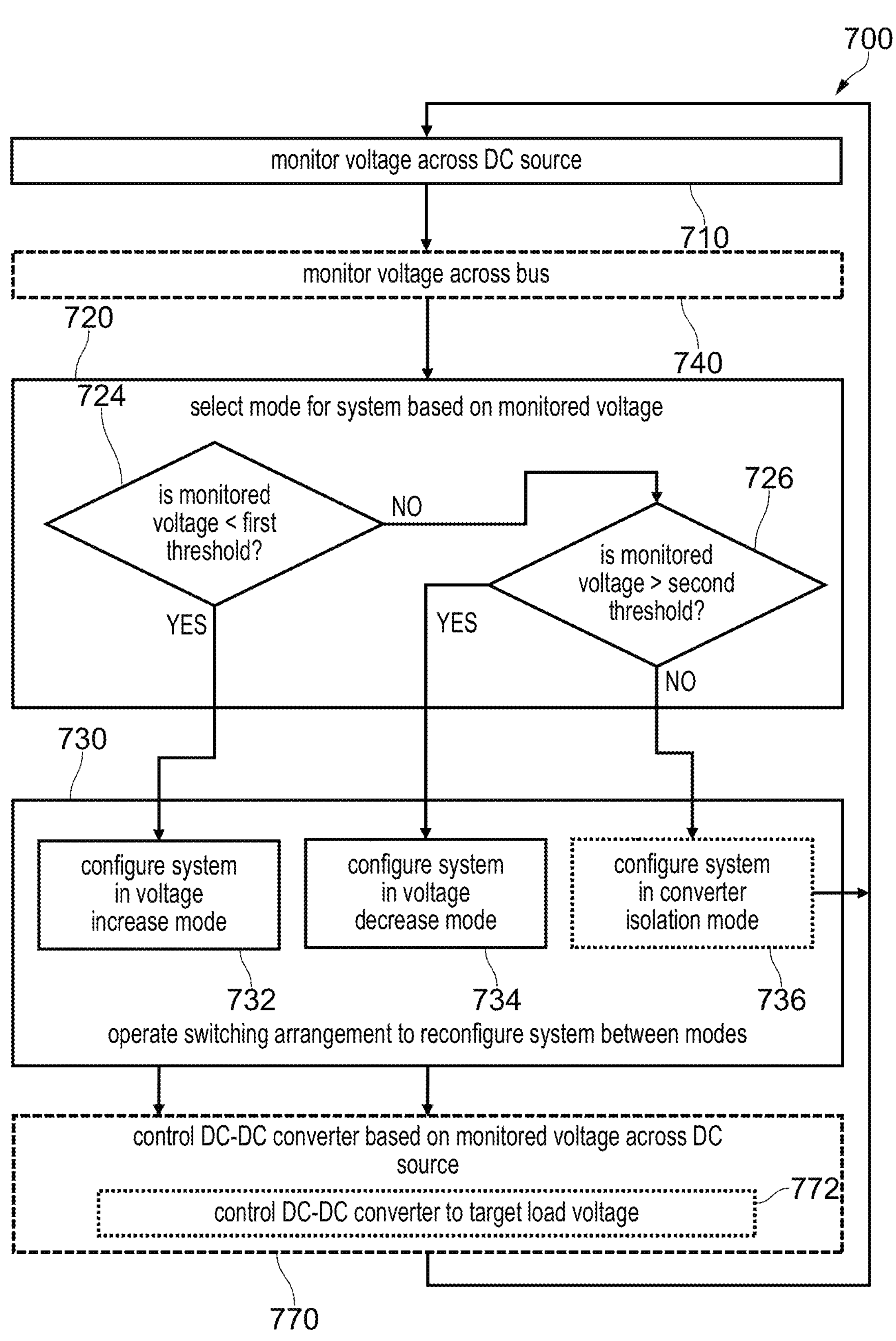
FIG. 9 is a flowchart which shows an example method of controlling the example electrical system of FIG. 3 or FIG. 6.

FIG. 9 is a flowchart which shows an example method 700 of controlling an electrical system according to the present disclosure, such as either of the example electrical systems 200, 200' described above with reference to FIGS. 3-8.

In general, the method 700 comprises operating the switching arrangement 240 to selectively configure (and reconfigure) the electrical system 200, 200' between the converter isolation mode and at least one converter connected mode (i.e. the voltage decrease mode and/or the voltage increase mode). Specifically, the method 700 may comprise operating the switching arrangement 240 to selectively configure (and reconfigure) the electrical system 200, 200' between each of the voltage decrease mode, the voltage increase mode and the converter isolation mode based on a monitored voltage across the DC source 220.

To this end, the method 700 includes an action of monitoring (at block 710) the voltage across the DC source 220. As described above, the electrical system 200, 200' comprises a DC source monitoring (e.g., sensing) arrangement 292 for the purpose of monitoring (at block 710) the voltage across the DC source 220. Therefore, the method 700 may include monitoring (at block 710) the voltage across the DC source 220 using the DC source sensing arrangement 292. Suitable transducers and devices for use in such DC source sensing arrangements will be apparent to those skilled in the art.

The method 700 also includes an action of selecting (at block 720) a mode for the electrical system 200, 200' based on voltage across the DC source 220. The action of selecting (at block 720) the mode for the electrical system 200, 200' comprises selecting between the voltage decrease mode, the voltage increase mode and the converter isolation mode of the electrical system 200, 200' as described above. After the mode for the electrical system 200, 200' has been selected, the method 700 proceeds to an action of operating (at block 730) the switching arrangement 240 to reconfigure the electrical system 200, 200' in the selected mode, if the electrical system 200, 200' is not already configured in the selected mode (and otherwise to maintain the electrical system 200, 200' in the respective mode). Accordingly, the method 700 may include operating (at block 730) the switching arrangement 240 to selectively reconfigure the electrical system 200, 200' between the voltage decrease mode, the voltage increase mode, and the converter isolation mode based on the monitored voltage across the DC source 220.

The action of selecting (at block 720) the mode for the electrical system 200, 200' comprises an action of determining whether (at block 724) the monitored voltage across the DC source 220 is less than a first voltage threshold. In response to a determination that the monitored voltage is less than the first voltage threshold, the voltage increase mode is selected for the electrical system 200, 200' and the action of operating (at block 730) the switching arrangement 240 to reconfigure the electrical system 200, 200' in the selected mode includes operating (at block 732) the switching arrangement 240 to reconfigure the electrical system 200, 200' in the voltage increase mode, if the electrical system 200, 200' is not already configured in the voltage increase mode. However, if the electrical system 200, 200' is already configured in the voltage increase mode, no further action is immediately taken and the method 700 continues as described herein.

Otherwise, in response to a determination that the monitored voltage is not less than the first voltage threshold, or otherwise, the action of selecting (at block 720) the mode for the electrical system 200, 200' may comprise an action of determining whether (at block 726) the monitored voltage is greater than a second voltage threshold. In response to a determination that the monitored voltage is greater than the second voltage threshold, the voltage decrease mode is selected for the electrical system 200, 200' and the action of operating (at block 730) the switching arrangement 240 to reconfigure the electrical system 200, 200' in the selected mode includes operating (at block 734) the switching arrangement 240 to reconfigure the electrical system 200, 200' in the voltage decrease mode, if the electrical system 200, 200' is not already configured in the voltage decrease mode. However, if the electrical system 200, 200' is already configured in the voltage decrease mode, no further action is immediately taken and the method 700 continues as described herein.

Finally, in response to a determination that the monitored voltage is not less than the first voltage threshold and is not greater than the second voltage threshold (for example, by sequential determinations with respect to the first and second thresholds, or by separately determining that the monitored voltage is between the first and second thresholds), the converter isolation mode is selected for the electrical system 200, 200' and the action of operating (at block 730) the switching arrangement 240 to reconfigure the electrical system 200, 200' in the selected mode includes operating (at block 736) the switching arrangement 240 to reconfigure the electrical system 200, 200' in the converter isolation mode, if the electrical system 200, 200' is not already configured in the converter isolation mode. However, if the electrical system 200, 200' is already configured in the converter isolation mode, no further action is immediately taken and the method 700 continues as described herein.

The second voltage threshold may be equal to or greater than the first voltage threshold. If the second voltage threshold is equal to the first voltage threshold, each voltage threshold may be represented by a single voltage threshold and the action of selecting (at block 720) the mode for the electrical system 200, 200' may comprise a single action of comparing (not shown) the monitored voltage across the DC source 220 to the single voltage threshold. If so, in response to a determination that the monitored voltage is less than the single voltage threshold, the voltage increase mode is selected for the electrical system 200, 200'. On the other hand, in response to a determination that the monitored voltage is greater than the single voltage threshold, the voltage increase mode is selected for the electrical system 200, 200'. Finally, in response to a determination that the monitored voltage is equal to (i.e., is neither less than nor greater than) the single voltage threshold, the converter isolation mode may be selected for the electrical system 200, 200'.

By virtue of the monitored voltage not being less than the first threshold and not being greater than the second voltage threshold, it may be determined that the monitored voltage is between the first voltage threshold and the second voltage threshold (if the second voltage threshold is greater than the first voltage threshold) or is equal to the first voltage threshold and the second voltage threshold (if the second voltage threshold is equal to the first voltage threshold). However, it is anticipated that, if the second voltage threshold is greater than the first voltage threshold, the action of selecting (at block 720) the mode for the electrical system 200, 200' may also comprise (e.g., following a determination that the monitored voltage is not greater than the second voltage threshold) an action of explicitly determining whether the monitored voltage is in an intermediate voltage range between the first voltage threshold and the second voltage threshold and selecting the converter isolation mode in response to a determination that the monitored voltage is in the intermediate voltage range.

The method 700 may also include an action of monitoring (at block 740) the voltage across the bus 230. As described above, the electrical system 200, 200' comprises a bus monitoring (e.g., sensing) arrangement 293 for the purpose of monitoring (at block 740) the voltage across the bus 230. Therefore, the method 700 may include monitoring (at block 740) the voltage across the bus 230 using a bus voltage sensing arrangement 293. Suitable transducers and devices for use in the such bus sensing arrangements. The method further includes an action of controlling (at block 770) the DC-DC converter, which is described after the following description of FIG. 10.

Figure 10:
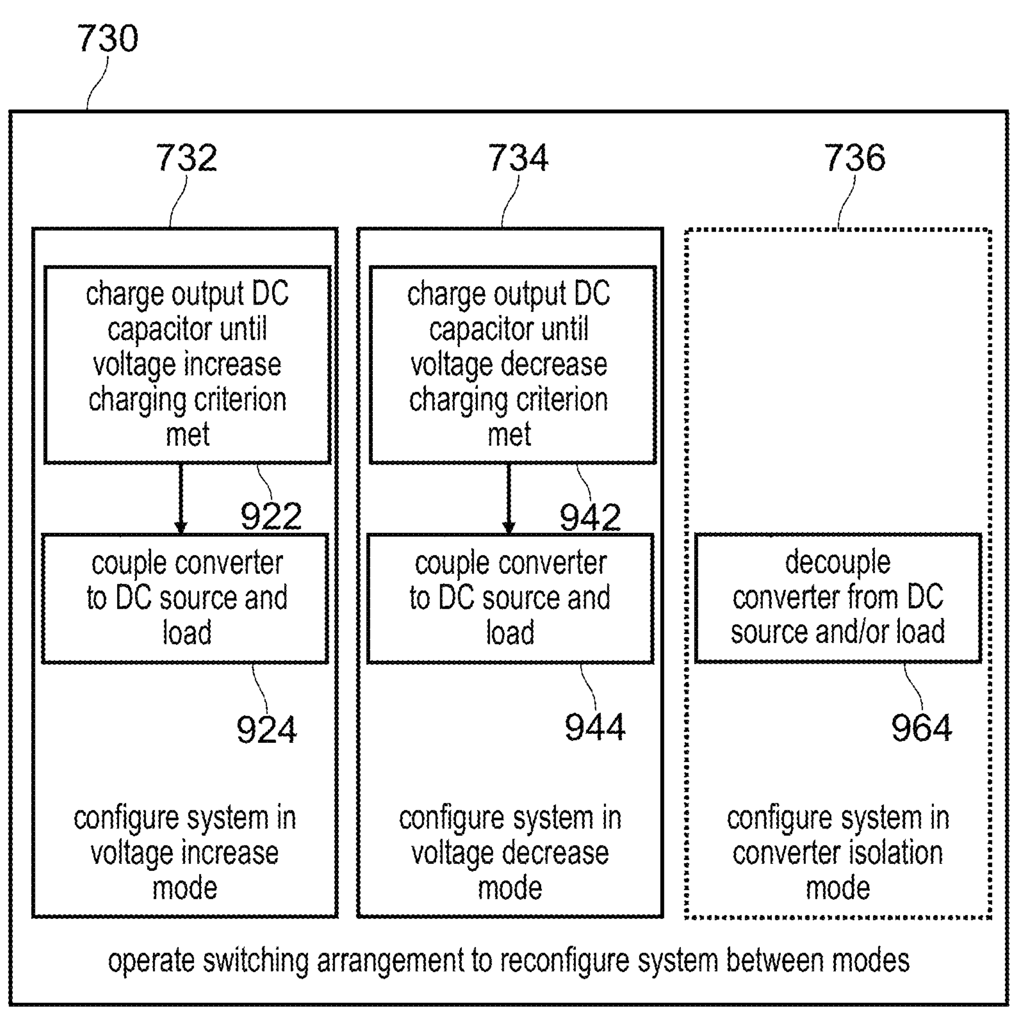
FIG. 10 is a flowchart which shows an example specific implementation of an action of the example method shown by FIG. 9.

FIG. 10 is a flowchart which shows an example specific implementation of the action of operating (at block 730) the switching arrangement 240 to reconfigure the electrical system 200, 200' in the selected mode.

In particular, the action of operating (at block 736) the switching arrangement 240 to reconfigure the electrical system 200, 200' in the converter isolation mode includes a step of decoupling (at block 964) at least the output side 254 of the DC-DC converter 250 from the DC source 220 and/or the bus 230. This may be achieved by operating the converter fault isolation arrangement 510 to isolate the output side 254 of the DC-DC converter 250 from the switching arrangement 240.

In addition, the action of operating (at block 732) the switching arrangement 240 to reconfigure the electrical system 200, 200' in the voltage increase mode includes sequentially executing a first voltage increase configuration step (at block 922) and a second voltage increase configuration step (at block 924).

The first voltage increase configuration step (at block 922) includes charging the output capacitor 253 of the output side 254 of the DC-DC converter 250 until a voltage increase charging criterion has been satisfied. To charge the output capacitor 253, the input side 252 of the DC-DC converter 250 is coupled to the DC source 220 and the conversion ratio of the DC-DC converter 240 is controlled appropriately. The voltage increase charging criterion may be determined to have been satisfied when a voltage across the output capacitor 253 is equal to, or within a predetermined target range of, a difference between the monitored voltage across the bus 230 (as monitored at block 740) and the monitored voltage across the DC source 220 (as monitored at block 710). The electrical system 200 may comprise an output capacitor monitoring (e.g., sensing) arrangement 294 for the purpose of monitoring the voltage across the output capacitor 253, as shown in FIGS. 4-5 and 7-8.

The second voltage increase configuration step (at block 924) includes coupling the output side 254 of the DC-DC converter 250 to the DC source 220 and the bus 230 for increasing the voltage supplied to the bus 230. This may be achieved by operating the converter fault isolation arrangement 510 to couple the output side 254 of the DC-DC converter 250 to the switching arrangement 240.

When the output side 254 is coupled to the DC source 200 and the bus 230 in this manner (at block 924), the voltage supplied to the bus 230 by the switching arrangement 240 is immediately increased by an amount substantially equal to the voltage across the output capacitor 253. Because the output capacitor 253 has been charged in the first voltage configuration step (at block 924) so that the voltage across the output capacitor 253 is equal to, or within the predetermined target range of, the difference between the monitored voltage across the bus 230 and the monitored voltage across the DC source 220, the voltage supplied to the bus 230 is not subject to any sudden step-changes or significant variations as the electrical system 200, 200' is reconfigured for operation in the voltage increase mode. The bus 230 is therefore protected from transient voltage spikes which may otherwise arise as a result of the electrical system 200, 200' being reconfigured in the voltage increase mode.

Finally, the action of operating (at block 734) the switching arrangement 240 to reconfigure the electrical system 200, 200' in the voltage decrease mode includes sequentially executing a first voltage decrease configuration step (at block 942) and a second voltage decrease configuration step (at block 944).

The first voltage decrease configuration step (at block 942) includes charging the output capacitor 253 of the output side 254 of the DC-DC converter 250 until a voltage decrease charging criterion has been satisfied. To charge the output capacitor 253, the input side 252 of the DC-DC converter 250 is coupled to the DC source 220 and the conversion ratio of the DC-DC converter 240 is controlled appropriately. The voltage decrease charging criterion may be determined to have been satisfied when a voltage across the output capacitor 253 is equal to, or within a predetermined target range of, a difference between the monitored voltage across the bus 230 (as monitored at block 740) and the monitored voltage across the DC source 220 (as monitored at block 710).

The second voltage decrease configuration step (at block 944) includes coupling the output side 254 of the DC-DC converter 250 to the DC source 220 and the bus 230 for decreasing the voltage supplied to the bus 230. This may be achieved by operating the converter fault isolation arrangement 510 to couple the output side 254 of the DC-DC converter 250 to the switching arrangement 240.

When the output side 254 is coupled to the DC source 200 and the bus 230 in this manner (at block 944), the voltage supplied to the bus 230 by the switching arrangement 240 is immediately decreased by an amount substantially equal to the voltage across the output capacitor 253. Because the output capacitor 253 has been charged in the first voltage configuration step (at block 944) so that the voltage across the output capacitor 253 is equal to, or within the predetermined target range of, the difference between the monitored voltage across the bus 230 and the monitored voltage across the DC source 220, the voltage supplied to the bus 230 is not subject to any sudden step-changes or significant variations as the electrical system 200, 200' is reconfigured for operation in the voltage decrease mode. Accordingly, the bus 230 is protected from transient voltage spikes which may otherwise arise as a result of the electrical system 200, 200' being reconfigured in the voltage decrease mode.

Referring again to FIG. 9, the method 700 further comprises an action of controlling (at block 770) the DC-DC converter based on the monitored voltage across the DC source 220. Namely, by varying the conversion ratio of the DC-DC converter 250, the voltage supplied to the bus 230 may be varied when the electrical system 200, 200' is configured in a converter connected mode. The action of controlling (at block 770) the DC-DC converter 250 based on the monitored voltage across the DC source 220 may include controlling (at block 772) the DC-DC converter 250 to target maintaining the voltage supplied to the bus 230 at a target bus voltage. Because the voltage supplied to the bus 230 is primarily only a function of the voltage across the DC source 220 and the conversion ratio of the DC-DC converter 250 when the electrical system 200, 200' is configured in either of the voltage increase mode and the voltage decrease mode, the method 700 need not necessarily include the action of monitoring (at block 740) the voltage across the bus 230 in order to control (at block 772) the DC-DC converter 250 to target maintaining the voltage supplied to the bus 230 at the target bus voltage. In other words, control (in block 772) of the DC-DC converter 250 to target maintaining the voltage supplied to the bus 230 at the target bus voltage may be based on an open-loop form of control. Otherwise, if the method 700 includes the action of monitoring (at block 740) the voltage across the bus 230, control (in block 772) of the DC-DC converter 250 to target maintaining the voltage supplied to the bus 230 at the target bus voltage may be based on a closed-loop form of control. That is to say that the action of controlling (at block 770) the DC-DC converter 250 may include controlling (at block 772) the DC-DC converter 250 based on both the monitored voltage across the DC source 220 and the monitored voltage across the bus 230 to target maintaining the voltage supplied to the bus 230 at the target bus voltage.

As discussed above, it may be that the bus 230 is associated with a design operating voltage or a design operating voltage range. In the former case, the target bus voltage may be equal to the design operating voltage of the bus 230. In the latter case, the target bus voltage may be equal to the lower design operating voltage of the bus 230, equal to the upper design operating voltage of the bus 230, or between the lower design operating voltage of the bus 230 and the upper design operating voltage of the bus 230 inclusive. Preferably, the first voltage threshold is selected as being equal to the lower design operating voltage of the bus 230 and/or the second voltage threshold is selected as being equal to the upper design operating voltage of the bus 230. If so, the actions of the method 700 described herein therefore result in the voltage across the load 230 being biased toward (and into) the target bus voltage range (which preferably corresponds to the design operating voltage range of the load 210). Therefore, the method 700 is executed to maintain the voltage supplied to the bus 230 within the target bus voltage range.

When the electrical system 200, 200' is operated in the converter isolation mode, the voltage across the DC source 220 is substantially equal to the voltage supplied to the bus 230, neglecting any significant energy losses within other parts of the electrical system 200, 200'.

Otherwise, when the electrical system 200, 200' is operated in the voltage decrease mode, the voltage across the DC source 220 is substantially equal to a sum of the voltage supplied to the bus 230 and a voltage across the output side 254 of the DC-DC converter 250. In turn, the voltage across the output side 254 of the DC-DC converter 250 is a function of the voltage across the input side 252 of the DC-DC converter 250 and the conversion ratio of the DC-DC converter 250.

Therefore, in a scenario in which the electrical system 200, 200' is operated in the converter isolation mode and the voltage across the DC source 220 is or becomes relatively high (e.g. when the voltage across the DC source 220 is greater than the second voltage threshold), the voltage supplied to the bus 230 may be relatively decreased in response by reconfiguring the electrical system 200, 200' in the voltage decrease mode. The voltage across the DC source 220 may be relatively high when, for instance, the DC source 220 includes a battery and a state-of-charge of the battery is relatively high. Otherwise, the voltage across the DC source 220 may be relatively high when, for instance, the DC source 220 includes a fuel-cell pack and a current output of the fuel-cell pack is relatively low. These events may occur when the electrical system 200, 200' is undergoing a startup process, for example. A result of reconfiguring the electrical system 200, 200' in the voltage decrease mode (e.g., from the converter isolation mode) is that the voltage supplied to the bus 230 from the switching arrangement 240 falls. Further, when the electrical system 200, 200' is configured in the voltage decrease mode, the voltage supplied to the bus 230 may be precisely controlled by varying the conversion ratio of the DC-DC converter 250 as described above.

In contrast, when the electrical system 200, 200' is operated in the voltage increase mode, the voltage across the DC source 220 is substantially equal to a difference between the voltage supplied to the bus 230 and the voltage across the output side 254 of the DC-DC converter 250.

Therefore, in a scenario when the electrical system 200, 200' is operated in the converter isolation mode and the voltage across the DC source 220 is or becomes relatively low (e.g. when the voltage across the DC source 220 is less than the first voltage threshold), the voltage supplied to the bus 230 may be relatively increased in response by reconfiguring the electrical system 200, 200' in the voltage increase mode. The voltage across the DC source 220 may be relatively low when, for instance, the DC source 220 includes a battery and the state-of-charge of the battery is relatively low. Otherwise, the voltage across the DC source 220 may be relatively low when, for instance, the DC source 220 includes a fuel-cell pack and a current output of the fuel-cell pack is relatively high. A result of reconfiguring the electrical system 200, 200' in the voltage increase mode (e.g., from the converter isolation mode) is that the voltage supplied to the bus 230 rises. Further, when the electrical system 200, 200' is configured in the voltage increase mode, the voltage supplied to the bus 230 may be precisely controlled by varying the conversion ratio of the DC-DC converter 250 as described above.

The example method 700 and electrical system(s) 200, 200' described herein enable the voltage supplied to the bus 230 to be maintained within a target bus voltage range (e.g., the design operating voltage range of the bus 230) or at a target bus voltage (e.g., the design operating voltage of the bus 230) as the voltage across the DC source 220 varies across a range of operating conditions. If the voltage across the DC source 220 is subject to significant variations in use, the control system 290 described herein is able to respond by reconfiguring the electrical system 200, 200' in the voltage decrease mode, the voltage increase mode or the converter isolation mode as appropriate and optionally by controlling the conversion ratio of the DC-DC converter to precisely control the voltage supplied to the bus 230, preferably to maintain the voltage supplied to the bus 230 within the target bus voltage range or at the target bus voltage.

In an example, the design operating voltage of the bus 230 may be around 800 V, the DC source 220 may have a peak output voltage of 925 V (i.e., at a highest operating point) and a minimum output voltage of 660 V (i.e., at a lowest operating point). In this example, the DC-DC converter 250 may be used to increase the voltage supplied to the bus 230 relative to the voltage across the DC source 220 by up to around 140 V when the electrical system 200, 200' is operated in the voltage increase mode and to decrease the voltage supplied to the bus 230 relative to the voltage across the DC source 220 by up to around 125 V when the electrical system 200, 200' is operated in the voltage decrease mode.

The example electrical system(s) 200, 200' described herein facilitate the above because the switching arrangement 240 is operable to either relatively increase the voltage supplied to the bus 230 or relatively decrease the voltage supplied to the bus 230 by configuring the electrical system 200, 200' in the voltage increase mode or the voltage decrease mode, respectively. Therefore, electrical system(s) 200, 200' in accordance with the present disclosure facilitate the elevation and/or reduction of a nominal output voltage of the DC source 220 relative to the design operating voltage of the bus 230. In particular, the nominal voltage of the DC source 220 may be raised relative to the nominal output voltage of the DC source 220. In a previously-considered electrical system, the DC source was intentionally designed so as to have a relatively low nominal voltage to mitigate a risk of an excessive voltage being supplied to the bus when the electrical system undergoes a startup process and thereby reduce a risk of damage to other parts of the electrical system (e.g., parts of the bus). In electrical systems 200, 200' according to the present disclosure, the nominal output voltage of the DC source 220 may be relatively increased without risk of causing an excessive voltage to be supplied to the bus 230 when, for example, the electrical system 200, 200' is undergoing a startup process. In turn, this enables the DC source 220 comprising a battery of a fuel-cell pack having a greater number of battery-cells or fuel-cells, respectively, connected in series to be used within the electrical system 200, 200'. This may increase an energy efficiency of the DC source 220 and/or the electrical system 200, 200' as a whole due to reduced copper losses. This may also enable connecting cable size and/or weight as well as power electronics size and/or weight to be significantly reduced.

Further, because the output side 254 of the DC-DC converter 250 is coupled in series with respect to the DC source 220 and the bus 230 in both the voltage decrease mode and the voltage increase mode, a voltage rating of the switching devices of the output side of the DC-DC converter 250 may be relatively reduced compared to, for example, a previously-considered system in which the output side of the DC-DC converter 250 is coupled only to the bus 230. For instance, the switching devices of the output side 254 of the DC-DC converter 250 may be selected from a lower voltage component family (e.g., a 650 V-rated switch family) instead of being selected from a higher voltage component family (e.g., a 1200 V-rated switch family). Switching devices from the lower voltage component family may be lighter and/or have a higher switching speed than switching devices selected from the higher voltage component family. For the same reasoning, a size (and therefore a mass) of the output coil 259" may be reduced.

Although it has been described that the switching arrangement 240 is operable to selectively reconfigure the electrical system 200, 200' in each of the voltage decrease mode, the voltage increase mode and the converter isolation mode, it may be that the switching arrangement 240 is operable to selectively reconfigure the electrical system 200, 200' in only one (e.g., at least one), or only two (e.g., at least two), of the voltage decrease mode, the voltage increase mode and the converter isolation mode. Specifically, it may be that the switching arrangement 240 is operable to selectively reconfigure the electrical system 200, 200' in the converter isolation mode and at least one of the voltage decrease mode and the voltage increase mode. Accordingly, it may be that the control system 290 is configured to operate the switching arrangement to selectively configure (and reconfigure) the electrical system 200, 200' between the converter isolation mode and the at least one of the voltage decrease mode and the voltage increase mode (e.g. based on the monitored voltage across the DC source 220). Otherwise, it may be that the switching arrangement 240 is operable to selectively reconfigure the electrical system 200, 200' in the voltage decrease mode and at least one of the converter isolation mode and the voltage increase mode. Consequently, it may be that the control system 290 is configured to operate the switching arrangement to selectively configure (and reconfigure) the electrical system 200, 200' between the voltage decrease mode and the at least one of the converter isolation mode and the voltage increase mode based on the monitored voltage across the DC source 220.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

It will also be appreciated that whilst the invention has been described with reference to aircraft and aircraft propulsion systems, the electric machine drive techniques described herein could be used for many other applications. These include, but are not limited to, automotive, marine and land-based applications.

We claim:

1. An electrical system comprising:

a DC source configured to provide a DC electrical power, a voltage across the DC source being $V_{IN}$;

a bus electrically coupled to the DC source, the bus comprising a load;

an isolated DC-DC converter having an input side coupled in parallel with respect to the DC source and an output side coupled in series with respect to the DC source and the bus, wherein a voltage across the output side of the isolated DC-DC converter is $V_{OUT\ DC\text{-}DC}$;

a switching arrangement electrically coupled to the isolated DC-DC converter, the DC source, and the bus; and a control system; wherein, the input side of the isolated DC-DC converter is configured to receive a fraction of the DC electrical power provided by the DC source, the fraction being less than unity;

the control system is configured to operate the switching arrangement to selectively configure the electrical system in at least one of a voltage increase mode and a voltage decrease mode;

in the voltage increase mode, the switching arrangement of the electrical system is configured to couple the output side of the isolated DC-DC converter to the DC source and the bus to supply a voltage to the bus corresponding to $V_{IN}+V_{OUT\ DC\text{-}DC}$ that is an addition of the voltage across the DC source and the voltage across the output side of the isolated DC-DC converter; and in the voltage decrease mode, the switching arrangement of the electrical system is configured to couple the output side of the isolated DC-DC converter to the DC source and the bus to supply a voltage to the bus corresponding to $V_{IN}-V_{OUT\ DC\text{-}DC}$ that is a difference between the voltage across the DC source and the voltage across the output side of the isolated DC-DC converter.

2. The electrical system of claim 1, wherein the switching arrangement is configured to selectively configure the electrical system in the voltage increase mode and in the voltage decrease mode.

3. The electrical system of claim 2, wherein when the electrical system is configured in the voltage decrease mode, a polarity of the output side of the isolated DC-DC converter is in a first orientation with respect to a polarity of the DC source; and when the electrical system is configured in the voltage increase mode, the polarity of the output side of the isolated DC-DC converter is in a second orientation with respect to the polarity of the DC source, and wherein the second orientation opposes the first orientation.

4. The electrical system of claim 2, wherein the control system is configured to:

monitor the voltage across the DC source; and operate the switching arrangement to selectively reconfigure the electrical system between the voltage increase mode and the voltage decrease mode based on the monitored voltage across the DC source.

5. The electrical system of claim 4, wherein the control system is configured to operate the switching arrangement to selectively reconfigure the electrical system in:

the voltage increase mode in response to a determination that the monitored voltage across the DC source is less than a first voltage threshold; and the voltage decrease mode in response to a determination that the monitored voltage across the DC source is greater than a second voltage threshold, the second voltage threshold being equal to or greater than the first voltage threshold.

6. The electrical system of claim 5, wherein the output side of the isolated DC-DC converter comprises an output capacitor, and wherein the control system is configured to:

monitor the voltage across the bus;

in response to a determination that the monitored voltage across the DC source is less than the first voltage threshold, sequentially execute the steps of:

charging the output capacitor until the voltage across the output capacitor is equal to or within a target range of a difference between the monitored voltage across the bus and the monitored voltage across the DC source; and then coupling the output side of the isolated DC-DC converter to the DC source and the bus; and/or in response to a determination that the monitored voltage across the DC source is greater than the second voltage threshold, sequentially execute the steps of:

charging the output capacitor until the voltage across the output capacitor is equal to or within a target range of a difference between the monitored voltage across the bus and the monitored voltage across the DC source; and then coupling the output side of the isolated DC-DC converter to the DC source and the bus.

7. The electrical system of claim 1, wherein the control system is configured to:

monitor the voltage across the DC source; and control a conversion ratio of the isolated DC-DC converter based on the monitored voltage across the DC source.

8. The electrical system of claim 1, wherein the control system is configured to operate the switching arrangement to selectively configure the electrical system in a converter isolation mode; and when the electrical system is configured in the converter isolation mode:

the input side of the isolated DC-DC converter is decoupled from the DC source and/or the bus; and/or the output side of the isolated DC-DC converter is decoupled from the DC source and/or the bus.

9. The electrical system of claim 8, wherein the control system is configured to operate the switching arrangement to selectively reconfigure the electrical system in:

the voltage increase mode in response to a determination that the monitored voltage across the DC source is less than a first voltage threshold;

the voltage decrease mode in response to a determination that the monitored voltage across the DC source is greater than a second voltage threshold, the second voltage threshold being equal to or greater than the first voltage threshold; and the converter isolation mode in response to a determination that the monitored voltage across the DC source is:

between the first voltage threshold and the second voltage threshold, or equal to the first voltage threshold or the second voltage threshold.

10. The electrical system of claim 1, wherein the switching arrangement includes:

a first pair of switching devices coupled in series through a first junction, and a second pair of switching devices coupled in series through a second junction;

the first pair of switching devices and the second pair of switching devices are coupled in parallel with each other with respect to a pair of converter connection terminals; and the DC source and the bus are coupled to the switching arrangement at the first junction and the second junction;

the output side of the isolated DC-DC converter is coupled to the switching arrangement at the pair of converter connection terminals.

11. The electrical system of claim 1, wherein when the electrical system is configured in each of the voltage increase mode and the voltage decrease mode:

the input side of the isolated DC-DC converter is coupled in parallel with respect to the DC source between the DC source and the switching arrangement.

12. The electrical system of claim 1, wherein when the electrical system is configured in each of the voltage increase mode and the voltage decrease mode:

the input side of the isolated DC-DC converter is coupled in parallel with respect to the DC source between the switching arrangement and the bus.

13. An aircraft comprising the electrical system of claim 1.

14. The electrical system of claim 10, wherein:

the first pair of switching devices includes a first primary switching device and a first secondary switching device, the second pair of switching devices includes a second primary switching device and a second secondary switching device, the control system is configured to operate the switching arrangement to selectively reconfigure the electrical system in:

the voltage decrease mode by operating the first primary switching device and the second secondary switching device in a closed state and operating the first secondary switching device and the second primary switching device in an open state; and the voltage increase mode by operating the first secondary switching device and the second primary switching device in the closed state and operating the first primary switching device and the second secondary switching device in the open state.

15. The electrical system of claim 10, further comprising:

a converter fault isolation arrangement located between the switching arrangement and the output side of the isolated DC-DC converter, wherein the control system is configured to selectively configure the electrical system in a converter isolation mode by operating the first pair of switching devices and the second pair of switching devices in a closed state, and operating the converter fault isolation arrangement to isolate the output side of the isolated DC-DC converter from the switching arrangement.

* * * * *